United States Patent
Li et al.

(10) Patent No.: US 12,341,653 B2
(45) Date of Patent: Jun. 24, 2025

(54) SERVICE FLOW ADJUSTMENT METHOD AND COMMUNICATION APPARATUS

(71) Applicant: HUAWEI TECHNOLOGIES CO., LTD., Shenzhen (CN)

(72) Inventors: Rixin Li, Dongguan (CN); Shuai Xiao, Wuhan (CN); Li Xu, Shenzhen (CN); Qiwen Zhong, Shenzhen (CN)

(73) Assignee: Huawei Technologies Co., Ltd, Shenzhen (CN)

( * ) Notice: Subject to any disclaimer, the term of this patent is extended or adjusted under 35 U.S.C. 154(b) by 345 days.

(21) Appl. No.: 17/958,983

(22) Filed: Oct. 3, 2022

(65) Prior Publication Data
US 2023/0035379 A1    Feb. 2, 2023

Related U.S. Application Data

(63) Continuation of application No. PCT/CN2021/083100, filed on Mar. 25, 2021.

(30) Foreign Application Priority Data

Apr. 3, 2020 (CN) .......................... 202010260393.5

(51) Int. Cl.
*H04L 41/0816* (2022.01)
*H04L 5/00* (2006.01)
(Continued)

(52) U.S. Cl.
CPC ........ *H04L 41/0816* (2013.01); *H04L 5/0044* (2013.01); *H04L 41/0893* (2013.01); *H04L 41/0896* (2013.01); *H04L 47/22* (2013.01)

(58) Field of Classification Search
None
See application file for complete search history.

(56) References Cited

U.S. PATENT DOCUMENTS

| | | | | |
|---|---|---|---|---|
| 2018/0013511 A1* | 1/2018 | Hussain | ............... | H04J 14/0205 |
| 2019/0181999 A1* | 6/2019 | Du | ......................... | H04L 12/413 |

(Continued)

FOREIGN PATENT DOCUMENTS

| | | |
|---|---|---|
| CN | 109729588 A | 5/2019 |
| WO | 2018006305 A1 | 1/2018 |

(Continued)

OTHER PUBLICATIONS

"Draft FlexE 2.1 Implementation Agreement," Optical Internetworking Forum (OIF), IA OIF-FLEXE-02.1, pp. 1-59, XP044260015, International Telecommunication Union, Geneva, Switzerland (Feb. 2019).

(Continued)

*Primary Examiner* — Benjamin Lamont
(74) *Attorney, Agent, or Firm* — Leydig, Voit & Mayer, Ltd.

(57) ABSTRACT

A service flow adjustment method and a communication apparatus are provided. Slot adjustment information is carried in a client signal flow sent between nodes, so that times at which all nodes on a network switch slot configuration can be unified, to avoid service damage in a process of adjusting a network transmission bandwidth. The method includes: A first node receives a first client signal flow from a second node by using N slots of a first bundling group; and after first duration starting from a time at which the first node detects slot adjustment information, the first node receives the first client signal flow from the second node by using M slots of the first bundling group.

20 Claims, 17 Drawing Sheets

(51) Int. Cl.
*H04L 41/0893* (2022.01)
*H04L 41/0896* (2022.01)
*H04L 47/22* (2022.01)

(56) References Cited

U.S. PATENT DOCUMENTS

| | | | |
|---|---|---|---|
| 2020/0014480 A1* | 1/2020 | Xiang | H04J 3/1658 |
| 2020/0112383 A1* | 4/2020 | Liu | H04J 3/1647 |
| 2020/0259580 A1* | 8/2020 | Zhong | H04J 3/16 |
| 2021/0091871 A1* | 3/2021 | Deng | H04J 3/1694 |
| 2022/0416895 A1* | 12/2022 | Liu | H04L 5/0064 |

FOREIGN PATENT DOCUMENTS

| | | |
|---|---|---|
| WO | 2018103740 A1 | 6/2018 |
| WO | 2019015462 A1 | 1/2019 |
| WO | 2019128467 A1 | 7/2019 |
| WO | 2019134489 A1 | 7/2019 |

OTHER PUBLICATIONS

"Draft Standard for Ethernet Amendment: Media Access Control Parameters, Physical Layers and Management Parameters for 200 GB/s and 400 GB/s Operation," IEEE Computer Society, IEEE P802.3bs™ /D3.0, pp. 1-387, Institute of Electrical and Electronics Engineers, New York, New York (Jan. 10, 2017).

"IEEE Standard for Information technology—Telecommunications and information exchange between systems—Local and metropolitan area networks—Specific requirements, Part 3: Carrier sense multiple access with collision detection (CSMA/CD) access method and physical layer specifications," IEEE Computer Society, IEEE Std 802.3-2002, Total 1562 pages, Institute of Electrical and Electronics Engineers, New York, New York (Mar. 8, 2002).

"IA Flex Ethernet 2.1 Implementation Agreement," IA # OIF FLEXE-02.1, Total 56 pages, Fremont, CA (Jul. 2019).

"ITU-T SG15: G.mtn Metro Transport Network + Transport Support for IMT2020/5G Networks," Total 9 pages (Nov. 2018).

* cited by examiner

| SH | 0 | 1 | 2 | 3 | 4 | 5 | 6 | 7 | 8 | 9 | 10 | 11 | 12 | 13 | 14 | 15 | 16 | 17 | 18 | 19 | ... | 29 | 30 | 31 | 32 | 33 | 34 | 35 | 36 | 37 | 38 | 39 | 40 | 41 | 42 | ... | 57 | 58 | 59 | 60 | 61 | 62 | 63 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| 1 0 | 0X4B | | | | | | | | | OMF | CR | CC | Flexible Ethernet bundling group number (FlexE Group Number) | | | | | | | | | | | | 0x5 | | | | | | | | | Reserved (reserved) | | | | 0x000_000 | | | | | | |
| 0 1 | C | PHY map (map) | | | | | | | | | | | | | | | | | | | PHY number (number) | | | | | | | | | | | | | | | | | | | | | | |
| 0 1 | C | Configuration 1 | | | | | | | | | | | | | | | | | | | | | | | Configuration 2 | | | | | OMF | CR | Reserved (reserved) | | | | | | CRC-16 | | | | | |
| S S | S S | Management channel 1 | | | | | | | | | | | | | | | | | | | | | | | | | | | | | | | | | | | | | | | | | |
| S S | S S | Management channel 2 | | | | | | | | | | | | | | | | | | | | | | | | | | | | | | | | | | | | | | | | | |
| S S | S S | Management channel 3 | | | | | | | | | | | | | | | | | | | | | | | | | | | | | | | | | | | | | | | | | |

FIG. 4

| 0 | 1 | 2 | ... | 8 | 9 | 10 | 11 | 12 | ... | 17 | 18 | ... | 25 | 26 | ... | 33 | 34 | ... | 37 | 38 | ... | 41 | 42 | ... | 49 | 50 | ... | 57 | 58 | ... | 61 | 62 | ... | 65 |
|---|---|---|---|---|---|---|---|---|---|---|---|---|---|---|---|---|---|---|---|---|---|---|---|---|---|---|---|---|---|---|---|---|---|---|
| 1 | 0 | 0X4B | | | | Resv 00 | | Type (type) | | | Value 1 (Value 1) | | | Value 2 (Value 2) | | | 0xC | | | 0x0 | | | Value 3 (Value 3) | | | Value 4 (Value 4) | | | (Sequence) Seq | | | CRC | | |

FIG. 15

SERVICE FLOW ADJUSTMENT METHOD AND COMMUNICATION APPARATUS

CROSS-REFERENCE TO RELATED APPLICATIONS

This application is a continuation of International Application No. PCT/CN2021/083100, filed on Mar. 25, 2021, which claims priority to Chinese Patent Application No. 202010260393.5, filed on Apr. 3, 2020. The disclosures of the aforementioned applications are hereby incorporated by reference in their entireties.

TECHNICAL FIELD

This application relates to the field of Ethernet technologies, and in particular, to a service flow adjustment method and a communication apparatus.

BACKGROUND

An optical internet forum (OIF) releases a flexible Ethernet (FlexE). The FlexE is a general technology that supports a plurality of Ethernet media access control (MAC) layer rates. A concept of a flexible Ethernet bundling group (which may also be referred to as a FlexE group or a bundling group for short) is introduced into the FlexE. The bundling group may be formed by bundling a plurality of physical layer apparatuses (which may also be considered as physical link interfaces and may be denoted as PHYs). A bandwidth resource corresponding to one bundling group is a sum of bandwidth resources corresponding to PHYs in the bundling group. Therefore, based on the bundling group, the FlexE can meet a higher transmission rate and a larger transmission bandwidth.

FIG. 1 is a schematic diagram of an example of a communication system based on a flexible Ethernet protocol. In the example in FIG. 1, one bundling group includes four PHYs. A FlexE divides a bandwidth resource of each PHY into a plurality of slots in a time division multiplexing (TDM) manner, to implement hard isolation of a transmission pipe bandwidth. A flexible Ethernet protocol client (FlexE Client) represents a service flow transmitted in a specified slot (one slot or a plurality of slots) in a FlexE group. One FlexE group may carry a plurality of FlexE clients, and one FlexE client corresponds to one service flow (typically, may be referred to as a medium access control (MAC) client). A flexible Ethernet protocol function layer (which may also be referred to as a FlexE shim) provides data adaptation and conversion from the FlexE client to the MAC client.

To better meet requirements of various types of services, in some application scenarios, a bandwidth of a transmission channel in a FlexE network needs to be adjusted. Because one service flow may be allocated to one or more preconfigured slots, from this perspective, adjusting the bandwidth of the transmission channel in the FlexE network may also be considered as adjusting a slot carrying the service flow. Currently, a method for adjusting the transmission bandwidth is that a transmit node and a receive node negotiate a time for switching slot configuration, and then switch the slot configuration. It can be learned that a current negotiation mechanism for switching the slot configuration may be used for point-to-point transmission. However, the method is not applicable to a network in which another network node exists between the transmit end and the receive end, that is, the current negotiation mechanism is not applicable to the end-to-end transmission. As a result, the receive end cannot know an accurate time at which the transmit end switches slot configuration, and cannot correctly restore a data stream sent by the transmit end, causing service damage.

SUMMARY

This application provides a service flow adjustment method and a communication apparatus, to unify times at which all nodes on a network switch slot configuration, so that a receive end correctly restores a service flow sent by a transmit end, thereby improving service data transmission reliability.

According to a first aspect, an embodiment of this application provides a service flow adjustment method. The method may be performed by a first communication apparatus. The first communication apparatus may be a network device on a FlexE or MTN network, or a communication apparatus that can support the network device to implement a function required in the method, for example, a chip system. The following provides description by using an example in which the network device is a first node. The method includes:

The first node receives a first client signal flow from a second node by using N slots of a first bundling group, and receives the first client signal flow from the second node by using M slots of the first bundling group after first duration starting from a time at which the first node detects slot adjustment information, where the first client signal flow includes the slot adjustment information, the first bundling group includes P PHY links, a bandwidth resource of each PHY link is divided into Q slots, bandwidth resources of the first bundling group are divided into P×Q slots, and N, P, Q, and M are all integers greater than or equal to 1.

In this embodiment of this application, the first client signal flow includes the slot adjustment information. After the first duration starting from the time at which the first node detects the slot adjustment information, the first node switches from the N slots to the M slots to receive the first client signal flow. In other words, when sending the first client signal flow to the first node, the second node switches from the N slots to the M slots to send the first client signal flow after the first duration starting from the time at which the second node detects the slot adjustment information. It can be learned that in this solution, time adjustment information is carried in the client signal flow, so that a time at which the first node switches the slot and a time at which the second node switches the slot can be unified. Therefore, it can be ensured that the first node serving as a receive end restores the first client signal flow based on the slot adjustment information, thereby avoiding service damage in a process of adjusting a bandwidth of a transmission channel. In addition, the time adjustment information is sent together with the client signal flow. Compared with a method for negotiating, by two nodes, a time for switching slot configuration through message exchange, a delay is reduced.

In a possible implementation, the receiving, by a first node, a first client signal flow from a second node by using N slots of a first bundling group includes: The first node receives a plurality of code blocks by using the N slots of the first bundling group, where the slot adjustment information is carried on at least one of the plurality of code blocks.

For example, the first node receives N code blocks in one receiving period by using the N slots of the first bundling group. The slot adjustment information may be carried on one of the N code blocks, to reserve as many idle resources as possible. Alternatively, the slot adjustment information may be carried on several of the N code blocks, to avoid a case in which a bandwidth of a transmission channel cannot be adjusted based on the slot adjustment information because a code block carrying the slot adjustment information is lost.

For example, the first node receives S×N code blocks in S consecutive receiving periods by using the N slots of the first bundling group, where the slot adjustment information is carried on at least one of the S×N code blocks, and S is greater than or equal to 2. Similar to the embodiment, for the S consecutive receiving periods, the slot adjustment information may be carried on one code block, to reserve more idle resources; or for each of the S receiving periods, the slot adjustment information may be carried on one or more code blocks, to help the first node accurately restore service data.

In a possible implementation, M may be greater than N, that is, a bandwidth of a transmission channel is increased, to be applicable to a service that has a high requirement on a transmission delay.

In comparison, M may be less than N, that is, a bandwidth of a transmission channel is reduced, and resources are saved as many as possible while ensuring reliable service transmission.

In a possible implementation, M may be equal to N, and a location of at least one of the M slots is different from a location of at least one of the N slots. In other words, although a bandwidth of a transmission channel remains unchanged, resources carrying the client signal flow change, which facilitates resource allocation for various services and improves resource utilization.

It should be understood that when M is greater than N and when M is less than N, positions of the M slots and positions of the N slots are not limited in this embodiment of this application. For example, the M slots partially overlap the N slots, or the M slots do not overlap the N slots.

In a possible implementation, after the first node receives the first client signal flow from the second node by using the N slots of the first bundling group, and before the first duration, the first node sends the first client signal flow to a third node by using N slots of a second bundling group, where the first client signal flow includes the slot adjustment information. Then, after second duration starting from a time at which the first node detects the slot adjustment information, the first node sends the first client signal flow to the third node by using M slots of the second bundling group. In this solution, the second node, the first node, and the third node may switch slot configuration after different duration starting from times at which the second node, the first node, and the third node detect the slot adjustment information, so that all nodes on a network synchronously switch slot configuration. After receiving the first client signal flow, the first node forwards the first client signal flow to the third node, without interrupting service data transmission.

In a possible implementation, after the first node receives the first client signal flow from the second node by using the N slots of the first bundling group, before the first duration, the first node sends, to a third node by using N slots of a second bundling group, a first client signal flow obtained after the slot adjustment information is deleted; and after the first duration, the first node sends the first client signal flow to the third node by using M slots of the second bundling group, where the first client signal includes the slot adjustment information. The first client signal flow that successively passes through the second node, the first node, and the third node includes the slot adjustment information. After receiving the first client signal flow sent by the second node, the first node deletes the slot adjustment information from the first client signal flow, switches the slot configuration, and then sends the first client signal flow carrying the slot adjustment information to the third node. To be specific, each node first switches slot configuration, and then transmits slot adjustment information to a next node.

In a possible implementation, when M is greater than N, and in a process in which the first node sends the first client signal flow to the third node by using the N slots of the second bundling group, the first node fills, with an idle code block, a slot not carrying the first client signal flow in the M slots. Because it takes the node a specific time period to switch the slot configuration, in the process in which the first node sends the first client signal flow to the third node by using the N slots of the second bundling group, the first node fills, with the idle code block, the slot not carrying the first client signal flow in the M slots, so that a bandwidth of a transmission channel may be first increased, to ensure reliable transmission of the first client signal flow.

In comparison, when M is less than N, at least one of the N slots received by the first node is filled with an idle code block. In a process in which the second node sends the first client flow to the first node by using the N slots of the first bundling group, the second node fills at least one of the N slots with the idle code block. In other words, when M is less than N, a bandwidth of a transmission channel is reduced. However, before the bandwidth of the transmission channel is reduced, at least one of the N slots may be first filled with the idle code block, to first reduce a bandwidth of a client signal, thereby avoiding service damage, caused by the reduced bandwidth of the transmission channel, that may occur before the bandwidth of the client signal is reduced.

In this embodiment of this application, the first duration may be predefined in a protocol, or may be indicated by the slot adjustment information. For example, the slot adjustment information carries the first duration. The slot adjustment information may be carried on a code block in a conventional technology, and a field identifier of the code block is reused. In this way, the slot adjustment information is sent together with the client signal, and does not need to be sent by using other signaling or the like, thereby reducing message interaction.

For example, the slot adjustment information is carried in a type field of a first code block in the first client signal flow, the type field indicates a type of the first code block and the first duration, and different values of the type field correspond to different first duration. To be specific, the slot adjustment information may reuse the type field in the first code block to represent, for example, newly define a type, to distinguish from another code block. In this manner, the type may be bound to the first duration.

For example, the slot adjustment information is carried in a type field and a value field of a first code block in the first client signal flow, the type field indicates a type of the first code block, and the value field indicates the first duration. Similar to the embodiment, the slot adjustment information may reuse the type field in the first code block to represent, for example, newly define a type. A difference lies in that the first duration is represented by reusing the value field in the first code block, and first duration of any length can be indicated without defining more types.

In this embodiment of this application, the first duration may be specific duration, or may be indicated by using a quantity of unit duration, which is more flexible. For example, the slot adjustment information includes the first duration. For another example, the slot adjustment information includes a first coefficient, where the first duration is unit duration of the first coefficient. The first duration is indicated by using the first coefficient, which does not need to occupy more bits. This helps reuse the value field of the code block in the conventional technology.

In a possible implementation, before the first node receives the first client signal flow from the second node by using the N slots of the first bundling group, the first node receives a second client signal flow from the second node, where the second client signal flow carries third duration, and the third duration is used to query shortest duration required by the first node to switch from receiving the first client signal flow by using the N slots to receiving the first client signal flow by using the M slots. Then, the first node sends the second client signal flow to the third node, where the second client signal flow carries fourth duration, when the shortest duration is less than or equal to the third duration, the fourth duration is equal to the third duration, and when the shortest duration is greater than the third duration, the fourth duration is the shortest duration. Then, the first node receives the third client signal flow from the third node, and sends the third client signal flow to the second node, where the third client signal flow carries the first duration.

Because different nodes have different software and hardware designs, and the like, the nodes have different capabilities of switching slot configuration. Therefore, the nodes also have different shortest duration required for switching the slot configuration. Therefore, in this embodiment of this application, the second client signal flow is sequentially sent from the first node. If a next node determines that shortest duration required by the next node is less than the duration carried in the second client signal flow, the next node may directly forward the second client signal flow to a next node. On the contrary, if the next node determines that shortest duration required by the next node is greater than the duration carried in the second client signal flow, the next node may update the duration carried in the second client signal flow, and then forward the second client signal flow to a next node. According to this solution, shortest duration determined by the last node is shortest duration that can meet all nodes on the network, that is, the first duration, to reduce a failure rate of adjusting a bandwidth of a transmission channel.

In a possible implementation, the method further includes: If the second node does not receive the third client signal flow from the first node within first preset duration, the second node sends a first message to a remote device, where the first message is used to notify the remote device that the bandwidth adjustment fails. Link transmission may be interrupted due to a network fault or a node fault. In this case, the node may report the first message to the remote device such as a network management system, to maintain the network in time.

In a possible implementation, before the first node receives the first client signal flow from the second node by using the N slots of the first bundling group, the first node receives a fourth client signal flow from the second node, where the fourth client signal flow includes an identifier parameter, and the identifier parameter is used to query whether the first node has updated standby configuration information, if a value of the identifier parameter is a first value, it indicates that the standby configuration information has been updated, and if a value of the identifier parameter is a second value, it indicates that the standby configuration information has not been updated. Then, the first node sends the fourth client signal flow to the third node, where when the first node has not updated the standby configuration information, the value of the identifier parameter is the second value. Similar to the foregoing method for determining the first duration, in this solution, it can be ensured that a bandwidth of a transmission channel is adjusted only when all nodes on the network have updated standby slot configuration, to reduce a failure rate of adjusting the bandwidth of the transmission channel.

It should be understood that the first node may receive a fifth client signal flow from the third node, and then the first node sends the fifth client signal flow to the second node, where a value of an identifier parameter included in the fifth client signal flow is the first value or the second value.

In a possible implementation, the method further includes:

If the second node does not receive the fifth client signal flow from the first node within second preset duration, the second node sends a second message to a remote device, where the second message is used to notify the remote device that the bandwidth adjustment fails. Link transmission may be interrupted due to a network fault or a node fault. In this case, the node may report the first message to the remote device such as a network management system, to maintain the network in time.

According to a second aspect, an embodiment of this application provides a service adjustment method. The method may be performed by a second communication apparatus. The first communication apparatus may be a network device on a FlexE or MTN network, or a communication apparatus that can support the network device to implement a function required in the method, for example, a chip system. The following provides description by using an example in which the network device is a second node. The method includes:

The second node sends a first client signal flow to a first node by using N slots of a first bundling group, and sends the first client signal flow to the first node by using M slots of the first bundling group after first duration starting from a time at which the second node detects slot adjustment information, where the first client signal flow includes the slot adjustment information, the first bundling group includes P physical layer PHY links, a bandwidth resource of each PHY link is divided into Q slots, bandwidth resources of the first bundling group are divided into P×Q slots, N, P, and Q are all integers greater than or equal to 1, and M is an integer greater than or equal to 1.

In a possible implementation, that the second node sends a first client signal flow to a first node by using N slots of a first bundling group includes:

The second node sends a plurality of code blocks to the first node by using the N slots of the first bundling group, where the slot adjustment information is carried on at least one of the plurality of code blocks.

For example, the second node sends N code blocks to the first node in one sending period by using the N slots of the first bundling group, where the slot adjustment information is carried on at least one of the N code blocks.

For example, the second node sends S×N code blocks to the first node in S consecutive sending periods by using the N slots of the first bundling group, where the slot adjustment information is carried on at least one of the S×N code blocks, and S is greater than or equal to 2.

In a possible implementation, M is greater than N.

In a possible implementation, M is less than N.

In a possible implementation, M is equal to N, and a location of at least one of the M slots is different from a location of at least one of the N slots.

In a possible implementation, the method further includes:

Before the first duration, the second node receives a first client signal flow from a third node by using N slots of a second bundling group, where the first client signal flow includes the slot adjustment information. Then, after second duration starting from a time at which the second node detects the slot adjustment information, the second node receives the first client signal flow from the third node by using M slots of the second bundling group.

In a possible implementation, before the first duration, the second node sends a first client signal flow obtained after the slot adjustment information is deleted to a first node by using N slots of a first bundling group; and after the first duration, the second node sends the first client signal flow to the first node by using M slots of the first bundling group, where the first client signal flow includes the slot adjustment information.

In a possible implementation, when M is greater than N, and in a process in which the second node sends the first client signal flow to the first node by using the N slots of the first bundling group, the second node fills, with an idle code block, a slot not carrying the first client signal flow in the M slots.

In a possible implementation, the slot adjustment information carries the first duration.

In a possible implementation, the slot adjustment information is carried in a type field of a first code block in the first client signal flow, the type field indicates a type of the first code block and the first duration, and different values of the type field correspond to different first duration; or the slot adjustment information is carried in a type field and a value field of a first code block in the first client signal flow, the type field indicates a type of the first code block, and the value field indicates the first duration.

In a possible implementation, the slot adjustment information includes the first duration; or the slot adjustment information includes a first coefficient, and the first duration is unit duration of the first coefficient.

In a possible implementation, the method further includes:

The second node sends a second client signal flow to the first node, where the second client signal flow carries third duration, and the third duration is used to query shortest duration required by the first node to switch from receiving the first client signal flow by using the N slots to receiving the first client signal flow by using the M slots.

In a possible implementation, the method further includes:

The second node receives a third client signal flow from the first node, where the third client signal flow carries the first duration.

In a possible implementation, the method further includes:

The second node sends a fourth client signal flow to the first node, where the fourth client signal flow includes an identifier parameter, and the identifier parameter is used to query whether the first node has updated configuration information about receiving the first client signal flow by using the M slots, if a value of the identifier parameter is a first value, it indicates that the configuration information has been updated, and if a value of the identifier parameter is a second value, it indicates that the configuration information has not been updated.

In a possible implementation, the method further includes:

The second node receives a fifth client signal flow from the first node, where a value of an identifier parameter included in the fifth client signal flow is the first value or the second value.

In a possible implementation, the method further includes:

If the second node does not receive the third client signal flow from the first node within first preset duration, the second node sends a first message to a remote device, where the first message is used to notify the remote device that the bandwidth adjustment fails.

In a possible implementation, the method further includes:

If the second node does not receive the fifth client signal flow from the first node within second preset duration, the second node sends a second message to a remote device, where the second message is used to notify the remote device that the bandwidth adjustment fails.

For specific technical effects brought by this implementation, refer to the descriptions of the technical effects of the implementations of the first aspect. Details are not described herein again. For technical effects brought by the second aspect or the possible implementations of the second aspect, refer to the descriptions of the technical effects of the first aspect or the possible implementations of the first aspect.

According to a third aspect, an embodiment of this application provides a communication apparatus. The communication apparatus has a function of implementing behavior of the method embodiment in the first aspect. The function may be implemented by hardware, or may be implemented by hardware executing corresponding software. The hardware or the software includes one or more modules corresponding to the foregoing function. In a possible implementation, the communication apparatus includes a processor and a transceiver.

The transceiver is configured to receive a first client signal flow from a second node by using N slots of a first bundling group, where the first client signal flow includes slot adjustment information, the first bundling group includes P PHY links, a bandwidth resource of each PHY link is divided into Q slots, bandwidth resources of the first bundling group are divided into P×Q slots, and N, P, and Q are all integers greater than or equal to 1.

The processor is configured to: after first duration starting from a time at which the processor detects the slot adjustment information, control the transceiver to receive the first client signal flow from the second node by using M slots of the first bundling group, where the first client signal flow includes the slot adjustment information, and M is an integer greater than or equal to 1.

In a possible implementation, the transceiver is specifically configured to receive a plurality of code blocks by using the N slots of the first bundling group, where the slot adjustment information is carried on at least one of the plurality of code blocks.

For example, the transceiver is specifically configured to receive N code blocks in one receiving period by using the N slots of the first bundling group, where the slot adjustment information is carried on at least one of the N code blocks.

For example, the transceiver is specifically configured to receive S×N code blocks in S consecutive receiving periods by using the N slots of the first bundling group, where the slot adjustment information is carried on at least one of the S×N code blocks, and S is greater than or equal to 2.

In a possible implementation, M is greater than N.

In a possible implementation, M is less than N.

In a possible implementation, M is equal to N, and a location of at least one of the M slots is different from a location of at least one of the N slots.

In a possible implementation, the transceiver is further configured to: before the first duration, send the first client signal flow to a third node by using N slots of a second bundling group, where the first client signal flow includes the slot adjustment information. Then, the processor is further configured to: after second duration starting from a time at which the processor detects slot configuration information, control the transceiver to send the first client signal flow to the third node by using M slots of the second bundling group.

In a possible implementation, the transceiver is further configured to: before the first duration, send, to a third node by using N slots of a second bundling group, a first client signal flow obtained after the slot adjustment information is deleted; and after the first duration, send the first client signal flow to the third node by using M slots of the second bundling group, where the first client signal includes the slot adjustment information.

In a possible implementation, when M is greater than N, and in a process in which the transceiver sends the first client signal flow to the third node by using the N slots of the second bundling group, the processor is configured to fill, with an idle code block, a slot not carrying the first client signal flow in the M slots.

In a possible implementation, when M is less than N, at least one of the N slots received by the transceiver is filled with an idle code block.

In a possible implementation, the slot adjustment information carries the first duration.

In a possible implementation, the slot adjustment information is carried in a type field of a first code block in the first client signal flow, the type field indicates a type of the first code block and the first duration, and different values of the type field correspond to different first duration; or the slot adjustment information is carried in a type field and a value field of a first code block in the first client signal flow, the type field indicates a type of the first code block, and the value field indicates the first duration.

In a possible implementation, the slot adjustment information includes the first duration; or the slot adjustment information includes a first coefficient, and the first duration is unit duration of the first coefficient.

In a possible implementation, before that the transceiver receives a first client signal flow from a second node by using N slots of a first bundling group, the transceiver is further configured to:

receive a second client signal flow from the second node, where the second client signal flow carries third duration, and the third duration is used to query shortest duration required by the first node to switch from receiving the first client signal flow by using the N slots to receiving the first client signal flow by using the M slots, and/or shortest duration required by the first node to switch from sending the first client signal flow by using the N slots to sending the first client signal flow by using the M slots; and send the second client signal flow to the third node, where the second client signal flow carries fourth duration, when the shortest duration is less than or equal to the third duration, the fourth duration is equal to the third duration, and when the shortest duration is greater than the third duration, the fourth duration is the shortest duration.

In a possible implementation, the transceiver is further configured to:

receive a third client signal flow from the third node, where the third client signal flow carries the first duration; and send the third client signal flow to the second node.

In a possible implementation, before that the transceiver receives a first client signal flow from a second node by using N slots of a first bundling group, the transceiver is further configured to:

receive a fourth client signal flow from the second node, where the fourth client signal flow includes an identifier parameter, and the identifier parameter is used to query whether the first node has updated configuration information about receiving the first client signal flow by using the M slots, if a value of the identifier parameter is a first value, it indicates that the configuration information has been updated, and if a value of the identifier parameter is a second value, it indicates that the configuration information has not been updated; and send the fourth client signal flow to the third node, where when the first node has not updated the configuration information, the value of the identifier parameter is the second value.

In a possible implementation, the transceiver is further configured to:

receive a fifth client signal flow from the third node, where a value of an identifier parameter included in the fifth client signal flow is the first value or the second value; and send the fifth client signal flow to the second node.

For technical effects brought by the third aspect or the possible implementations of the third aspect, refer to the descriptions of the technical effects of the first aspect or the possible implementations of the first aspect.

According to a fourth aspect, an embodiment of this application provides a communication apparatus. The communication apparatus has a function of implementing behavior of the method embodiment in the second aspect. The function may be implemented by hardware, or may be implemented by hardware executing corresponding software. The hardware or the software includes one or more modules corresponding to the foregoing function. In a possible implementation, the communication apparatus includes a processor and a transceiver.

The transceiver is configured to send a first client signal flow to a first node by using N slots of a first bundling group, where the first client signal flow includes slot adjustment information, the first bundling group includes P physical layer PHY links, a bandwidth resource of each PHY link is divided into Q slots, bandwidth resources of the first bundling group are divided into P×Q slots, and N, P, and Q are all integers greater than or equal to 1.

The processor is configured to: after first duration starting from a time at which the processor detects the slot adjustment information, control the transceiver to send the first client signal flow to the first node by using M slots of the first bundling group, where the first client signal flow includes the slot adjustment information, and M is an integer greater than or equal to 1.

In a possible implementation, the transceiver is specifically configured to send N code blocks to the first node by using the N slots of the first bundling group, where the slot adjustment information is carried on at least one of the N code blocks.

For example, the transceiver is specifically configured to send N code blocks to the first node in one sending period by using the N slots of the first bundling group, where the slot adjustment information is carried on at least one of the N code blocks.

For example, the transceiver is specifically configured to send S×N code blocks to the first node in S consecutive sending periods by using the N slots of the first bundling group, where the slot adjustment information is carried on at least one of the S×N code blocks, and S is greater than or equal to 2.

In a possible implementation, M is greater than N.

In a possible implementation, M is less than N.

In a possible implementation, M is equal to N, and a location of at least one of the M slots is different from a location of at least one of the N slots.

In a possible implementation, the transceiver is further configured to: before the first duration, receive a first client signal flow from a third node by using N slots of a second bundling group, where the first client signal flow includes the slot adjustment information. Then, the processor controls, after second duration starting from a time at which the processor detects slot configuration information, the transceiver to receive the first client signal flow from the third node by using M slots of the second bundling group, and the first client signal flow includes the slot adjustment information.

In a possible implementation, the transceiver is configured to: before the first duration, send a first client signal flow obtained after the slot adjustment information is deleted; and after the first duration, send the first client signal flow to the first node by using M slots of the first bundling group, where the first client signal flow includes the slot adjustment information.

In a possible implementation, when M is greater than N, and in a process in which the transceiver sends the first client signal flow to the first node by using the N slots of the first bundling group, the processor is configured to fill, with an idle code block, a slot not carrying the first client signal flow in the M slots.

In a possible implementation, the slot adjustment information carries the first duration.

In a possible implementation, the slot adjustment information is carried in a type field of a first code block in the first client signal flow, the type field indicates a type of the first code block and the first duration, and different values of the type field correspond to different first duration; or the slot adjustment information is carried in a type field and a value field of a first code block in the first client signal flow, the type field indicates a type of the first code block, and the value field indicates the first duration.

In a possible implementation, the slot adjustment information includes the first duration; or the slot adjustment information includes a first coefficient, and the first duration is unit duration of the first coefficient.

In a possible implementation, the transceiver is further configured to:

send a second client signal flow to the first node, where the second client signal flow carries third duration, and the third duration is used to query shortest duration required by the first node to switch from receiving the first client signal flow by using the N slots to receiving the first client signal flow by using the M slots.

In a possible implementation, the transceiver is further configured to:

receive a third client signal flow from the first node, where the third client signal flow carries the first duration.

In a possible implementation, the transceiver is further configured to:

send a fourth client signal flow to the first node, where the fourth client signal flow includes an identifier parameter, and the identifier parameter is used to query whether the first node has updated configuration information about receiving the first client signal flow by using the M slots, if a value of the identifier parameter is a first value, it indicates that the configuration information has been updated, and if a value of the identifier parameter is a second value, it indicates that the configuration information has not been updated.

In a possible implementation, the transceiver is further configured to:

receive a fifth client signal flow from the first node, where a value of an identifier parameter included in the fifth client signal flow is the first value or the second value.

In a possible implementation, the transceiver is further configured to:

if the transceiver does not receive the third client signal flow from the first node within first preset duration, send a first message to a remote device, where the first message is used to notify the remote device that the bandwidth adjustment fails.

In a possible implementation, the transceiver is further configured to:

if the transceiver does not receive the fifth client signal flow from the first node within second preset duration, send a second message to a remote device, where the second message is used to notify the remote device that the bandwidth adjustment fails.

For technical effects achieved by the fourth aspect or the possible implementations of the fourth aspect, refer to the descriptions of the technical effects of the second aspect or the possible implementations of the second aspect.

According to a fifth aspect, an embodiment of this application provides a communication apparatus. The communication apparatus may be the communication apparatus in the third aspect or the fourth aspect in embodiments, or a chip disposed in the communication apparatus in the third aspect or the fourth aspect. The communication apparatus includes a communication interface and a processor, and optionally, further includes a memory. The memory is configured to store a computer program, instructions, or data. The processor is coupled to the memory and the communication interface. When the processor reads the computer program, the instructions, or the data, the communication apparatus is enabled to perform the method performed by the first node or the second node in the foregoing method embodiments.

It should be understood that the communication interface may be a transceiver in the communication apparatus, and is implemented, for example, by using a logic circuit, a transmitter circuit, and a receiver circuit in the communication apparatus. Alternatively, if the communication apparatus is a chip disposed in a network device, the communication interface may be an input/output interface of the chip, for example, an input/output pin. The transceiver is used by the communication apparatus to communicate with another device. For example, when the communication apparatus is a first node, the another device is a second node, or when the communication apparatus is a second node, the another device is a first node.

According to a sixth aspect, a communication apparatus is provided. The communication apparatus is a sending apparatus or a receiving apparatus, and includes a processor and a memory. Optionally, the communication apparatus further includes a transceiver. The memory is configured to store a computer program or instructions. The processor is configured to invoke the computer program or the instructions from the memory and run the computer program or the instructions. When the processor executes the computer program or the instructions in the memory, the communication apparatus is enabled to perform any implementation of any communication method in the first aspect and the second aspect.

In a possible design, there are one or more processors, and there are one or more memories. The memory may be integrated with the processor, or may be disposed independently of the processor. The transceiver may include a transmitter and a receiver that are coupled to each other.

According to a seventh aspect, an embodiment of this application provides a communication apparatus, including a transceiver unit and a processing unit, to perform any implementation of any service flow adjustment method in the first aspect and the second aspect. The transceiver unit is configured to perform functions related to sending and receiving. In a possible design, the transceiver unit includes a receiving unit and a sending unit. In a possible design, the communication apparatus is a communication chip, and the transceiver unit may be an input/output circuit or a port of the communication chip.

In another design, the transceiver unit may be a transmitter and a receiver, or the transceiver unit may be a transmitter and a receiver.

Optionally, the communication apparatus further includes modules that may be configured to perform any implementation of any communication method in the first aspect and the second aspect.

According to an eighth aspect, a communication apparatus is provided, and includes an input circuit, an output circuit, and a processing circuit. The processing circuit is configured to: receive a signal through the input circuit, and transmit a signal through the output circuit, so that the method in either of the first aspect and the second aspect and any possible implementation of the first aspect and the second aspect is implemented.

In a specific implementation process, the communication apparatus may be a chip. The input circuit may be an input pin. The output circuit may be an output pin. The processing circuit may be a transistor, a gate circuit, a trigger, any logic circuit, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in embodiments of this application.

According to a ninth aspect, an embodiment of this application provides a chip system. The chip system includes a processor, may further include a memory, and is configured to implement the methods performed by the communication apparatuses in the fourth aspect to the eighth aspect. In a possible implementation, the chip system further includes the memory, configured to store program instructions and/or data. The chip system may include a chip, or may include a chip and another discrete component.

According to a tenth aspect, an embodiment of this application provides a communication system. The communication system includes one or more communication apparatuses that perform the methods in the first aspect and the second aspect.

According to an eleventh aspect, this application provides a computer-readable storage medium. The computer-readable storage medium stores a computer program (which may also be referred to as code or instructions). When the computer program is run, a computer is enabled to perform the method in any possible implementation of the first aspect, or the computer is enabled to perform the method in any implementation of the first aspect and the second aspect.

According to a twelfth aspect, a computer program product is provided. The computer program product includes a computer program (which may also be referred to as code or instructions). When the computer program is run, a computer is enabled to perform the method in any possible implementation of the first aspect, or the computer is enabled to perform the method in any implementation of the first aspect and the second aspect.

For beneficial effects of the fifth aspect to the twelfth aspect and the implementations thereof, refer to the descriptions of the beneficial effects of the method in the first aspect, the second aspect, or the third aspect and the implementations thereof.

In embodiments of this application, the first client signal flow sent by the second node to the first node includes the slot adjustment information, so that a time at which the first node switches the slot and a time at which the second node switches the slot can be unified, thereby ensuring that the first node restores the first client signal flow based on the slot adjustment information, and avoiding service damage in a process of adjusting the bandwidth of the transmission channel by the first node and the second node. In addition, in embodiments of this application, the time adjustment information can be sent together with the client signal flow. Compared with a method for negotiating, by two nodes, a time for switching slot configuration through message exchange, a delay is reduced.

BRIEF DESCRIPTION OF DRAWINGS

FIG. 4 is a schematic diagram of FlexE instance overheads defined in an OIF FlexE IA;

FIG. 15 is a schematic diagram of a structure of a first code block according to an embodiment of this application;

DESCRIPTION OF EMBODIMENTS

The following clearly describes the technical solutions in embodiments of the present invention with reference to the accompanying drawings in embodiments of the present invention.

For ease of understanding by a person skilled in the art, before this application is described, some terms in embodiments of this application are first briefly explained and described.

A FlexE may support functions such as bundling, sub-rating, and channelization by bundling a plurality of PHYs. For example, in the FlexE, a plurality of 100GE PHY ports are bundled, and each 100GE port is divided by a granularity of 5G into 20 slots in time domain. The FlexE may support services at different Ethernet medium access control (MAC) rates. For example, a 200G MAC service is supported in a 2×100GE link group, to be specific, in the FlexE, a plurality of Ethernet ports are bundled into one link group to support a media access control (MAC) service whose rate is greater than that of a single Ethernet port, that is, the FlexE supports a bundling function. For another example, a 50G MAC service is supported to be transmitted in a 100GE link group, to be specific, a MAC service whose rate is less than that of a bandwidth of the link group or that of a bandwidth of a single Ethernet port is supported by allocating a slot to the service, that is, the FlexE supports a sub-rate function. For still another example, one 150G MAC service and two 25G MAC services can be supported to be simultaneously transmitted in a 2×100GE link group, to be specific, a plurality of MAC services in the link group are supported to be simultaneously transmitted by allocating slots to the services, that is, the FlexE supports a channelization function.

It can be learned that, in the FlexE, a plurality of service flows may be concurrently transmitted by using a FlexE group, and service data of a same service flow may be carried in one PHY in the FlexE group, or may be carried in different PHYs in the FlexE group. In other words, service data of a same service flow may be transmitted to a peer end by using one PHY in the FlexE group, or may be transmitted to a peer end by using a plurality of PHYs in the FlexE group. A bandwidth resource of one PHY is usually divided into a plurality of slots. During actual use, the service data is encapsulated in a slot, and then the slot is mapped to the PHY in the FlexE group.

Figure 1:
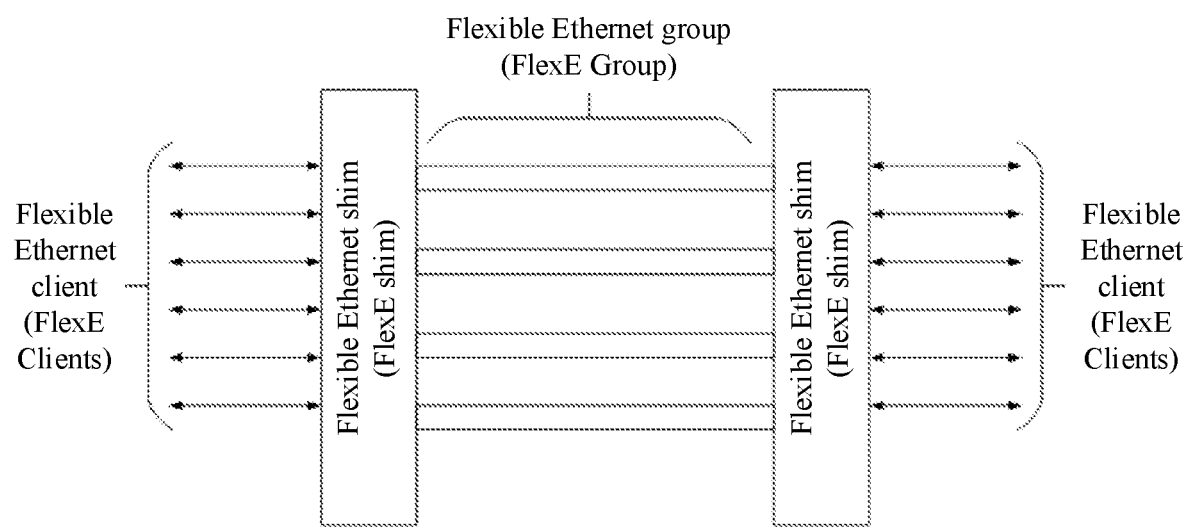
FIG. 1 is a schematic diagram of a communication system based on a flexible Ethernet protocol.
Figure 2:
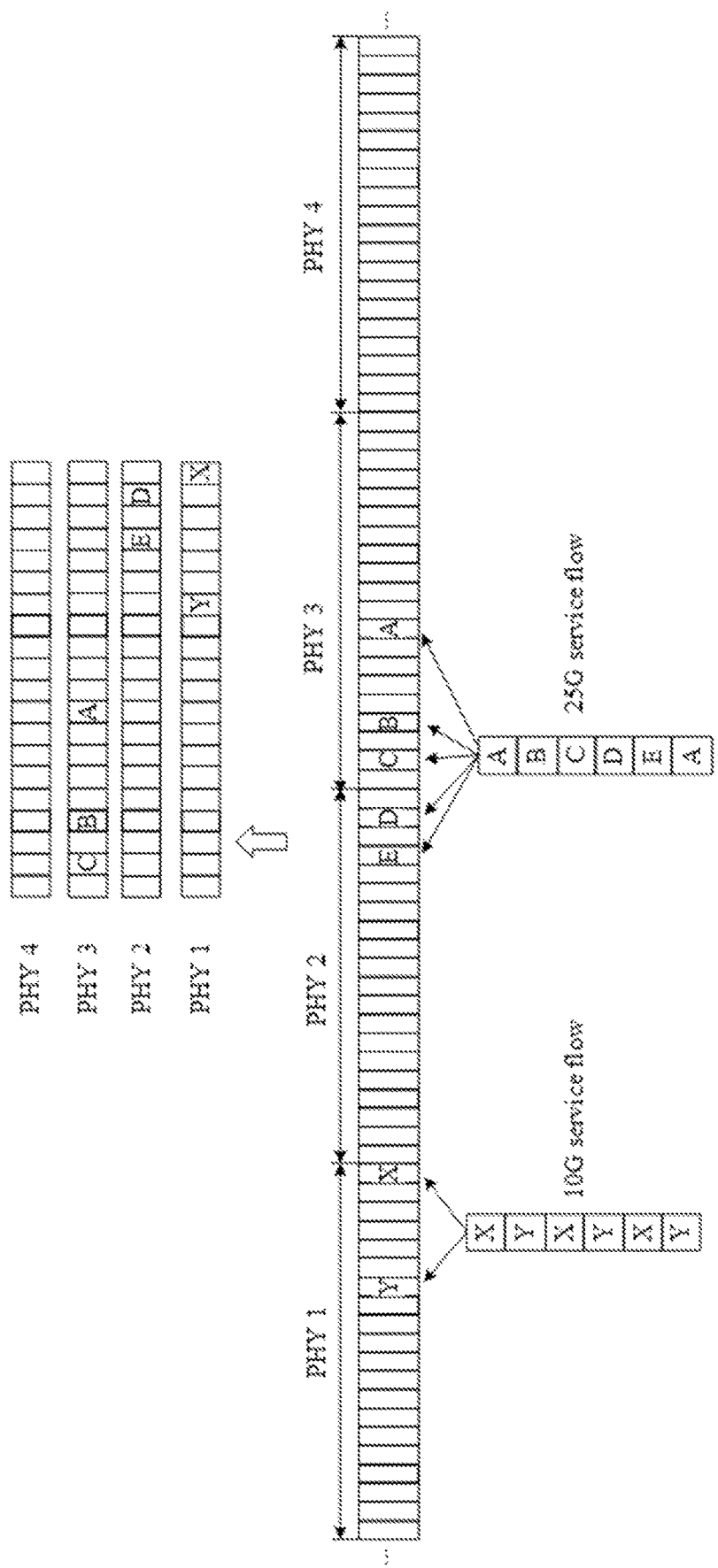
FIG. 2 is a schematic diagram of a principle of mapping a FlexE client service flow to a FlexE group.

For example, FIG. 2 is a schematic diagram of a principle of mapping a FlexE client service flow to a FlexE group. In the example in FIG. 2, the FlexE group is bundled to four 100GE PHYs. The four PHYs are a PHY 1, a PHY 2, a PHY 3, and a PHY 4. Each of the four PHYs is divided by a granularity of 5G into 20 slots in time domain. For example, a 10G service flow and a 25G service flow are transmitted by using the FlexE group. It should be understood that the 10G service flow may be carried in two slots, and the 25G service flow may be carried in five slots. The 10G service flow may be carried on a plurality of PHYs in the FlexE group, or may be carried on one PHY in the FlexE group (this is used as an example in FIG. 2, for example, the 10G service flow is carried in a slot X and a slot Y in the PHY 1). Similarly, the 25G service flow may be carried on one PHY in the FlexE group, or may be carried on a plurality of PHYs in the FlexE group (this is used as an example in FIG. 2, for example, the 25G service flow is carried in a slot D and a slot E in the PHY 2, and is carried in a slot A, a slot B, and a slot C in the PHY 3).

For a receive end, after receiving a service flow from a transmit end, the receive end needs to restore each service flow. For example, the receive end needs to determine that data carried in the slot D and the slot E in the PHY 2 and data carried in the slot A, the slot B, and the slot C in the PHY 3 belong to a same service flow. This requires the receive end to parse received data. To enable the receive end to correctly parse the data from the transmit end, when sending the service flow, the transmit end also sends an overhead code block indicating a service flow to which the data belongs.

Figure 3:
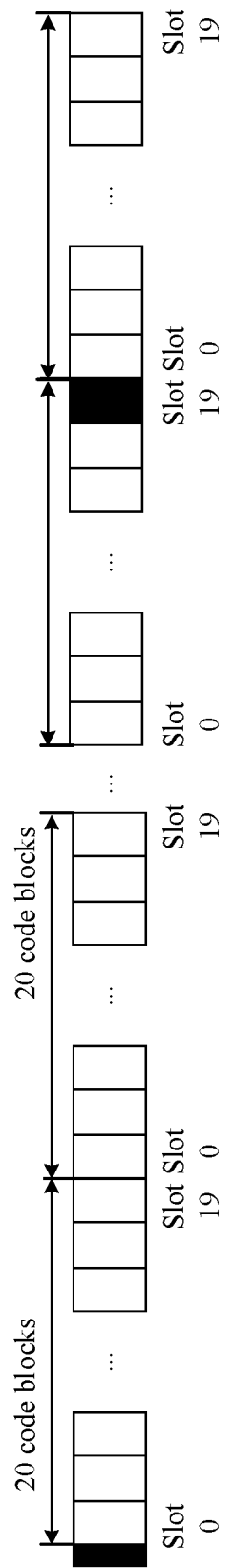
FIG. 3 is a schematic diagram of inserting an overhead code block into a service flow.

For example, FIG. 3 is a schematic diagram of inserting an overhead code block for the transmit end. In FIG. 3, a 100G PHY interface divided into 20 slots is used as an example. When sending a service flow, the transmit end may periodically insert an overhead code block. As shown in FIG. 3, one 66B overhead code block (FlexE overhead) is inserted at an interval of 1023×20 66B payload data code blocks. In FIG. 3, a black code block is used to represent the overhead code block, and a white code block is used to represent a payload data code block.

FIG. 4 is a schematic diagram of overheads of a FlexE 100G instance defined in a standard. Overheads of each FlexE 100G instance include a total of eight code blocks in a 64B/66B encoding format. The code block is a code block defined in the IEEE Std 802.3-2018.IEEE Standard for Ethernet SECTION SIX standard. In FIG. 4, a code block numbered 8 represents a slot configuration table indicator in use (or calendar configuration in use), and is denoted as C. If C is 0, it indicates that a calendar A is being used, and if C is 1, it indicates that a calendar B is being used. A code block numbered 9 represents a multiframe indication signal (overhead multiframe indicator, OMF), and indicates a location of a frame in a multiframe. A code block numbered 10 represents whether there is a remote PHY fault, and is denoted as RPF. For example, if the RPF is 1, it indicates that a fault occurs, and if the RPF is 0, it indicates that no fault occurs. A code block numbered 9 represents a synchronization path configuration indicator (synchronization configuration), and is denoted as SC. If the bit is 1, a sixth code block in the overheads is used as a time synchronization message bearer channel. If the bit is 0, a sixth code block in the overheads is used as a part of a shim-to-shim path. A calendar request (CR) is used to request a peer end to switch a slot configuration table. A calendar acknowledgement (CA) is used to confirm with a peer end that a local end is ready for configuration switching. A PHY map indicates FlexE instances in a bundling group. A PHY number indicates a sequence number or a number of a FlexE instance. The FlexE group number indicates a number of a FlexE group. A management channel is used to transmit a management control message of a device. For example, a management channel 1 occupies two 66B code blocks, and is used to transmit a control message of a section of the device. A management channel 2 is used to transmit a control message or a synchronization message between shim and shim. A management channel 3 occupies a plurality of 66B code blocks, and is used to transmit a control message between shim and shim.

It can be learned that, in addition to some specific indication fields, currently a portion of space is still used as reserved fields. In addition, five 66B code blocks are further provided and may be used by the management channel as information other than a data payload transmitted between two FlexE devices. The service flow from the transmit end to the receive end may be referred to as a FlexE frame. The FlexE frame is classified into a basic frame and a multi-frame. A single frame includes 8 rows×1 column of 66B overhead code blocks and 8 rows×(1023×20) columns of 66B payload code blocks, and 32 single frames form one multiframe. It should be understood that service data included in the service flow sent by the transmit end may be carried in a payload code block included in the multiframe. The receive end receives the multiframe, and may determine, based on the overhead code blocks, data on which payload code blocks belongs to a same service flow.

Figure 5:
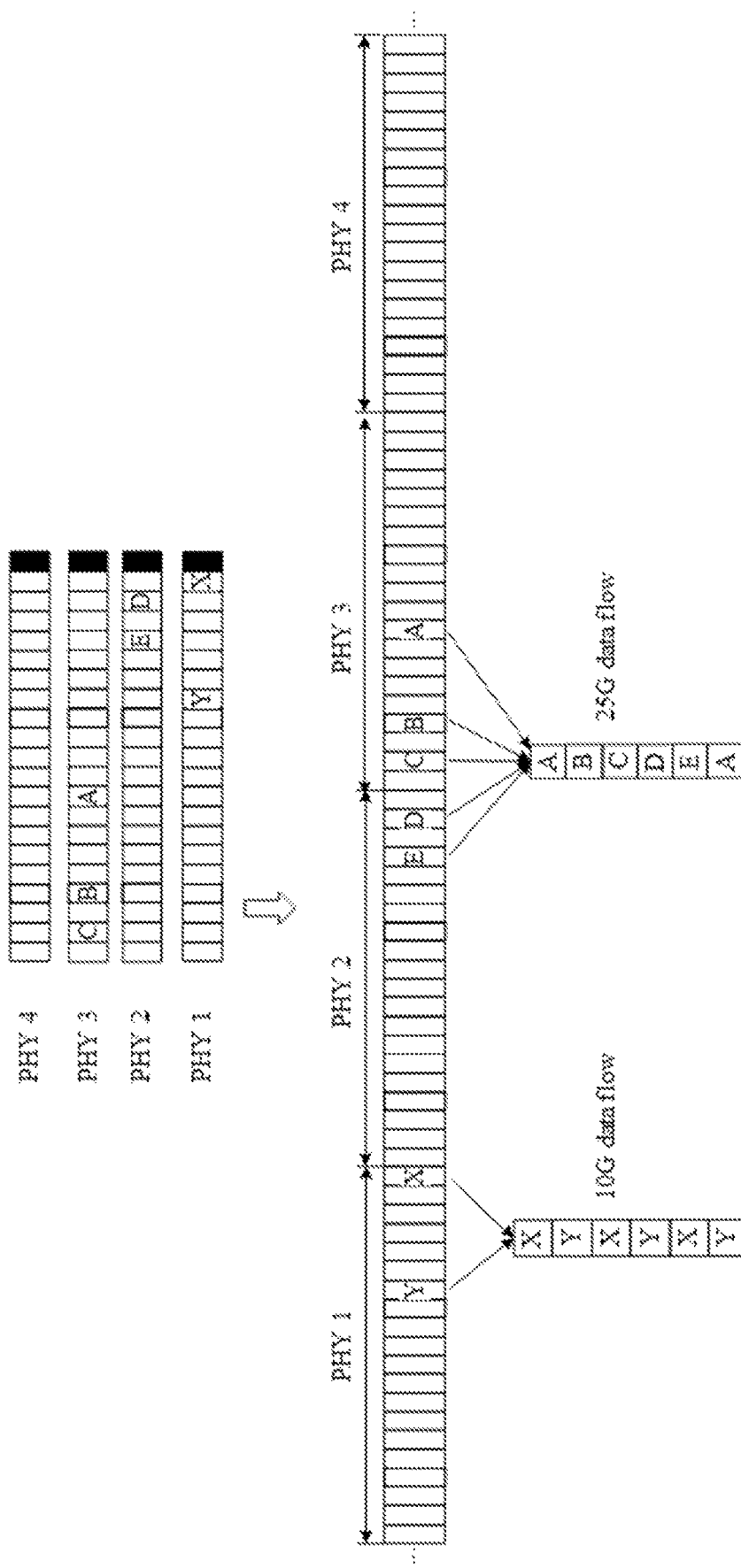
FIG. 5 is a schematic diagram of a principle of demapping a FlexE client service flow from a FlexE group.

For example, FIG. 5 is a schematic diagram of a principle of demapping a FlexE client service flow from a FlexE group. It should be understood that FIG. 5 is an inverse process of FIG. 2. In FIG. 5, a black code block indicates an overhead code block. It should be understood that each slot corresponds to one overhead code block indicating a service flow to which data carried in the slot belongs. The receive end correctly parses the service flow from the transmit end by using the overhead code block.

To better meet requirements of various types of services, in some application scenarios, a bandwidth of a transmission channel in a FlexE network needs to be adjusted, which may also be considered as adjusting a slot carrying the service flow. For example, if more home broadband services are performed at night than in the daytime, bandwidth resources allocated to the home broadband services may be increased at night. Currently, a method for adjusting the transmission bandwidth is that the transmit end and the receive end negotiate a time for switching slot configuration, and then switch the slot configuration.

It should be noted that the slot configuration may represent a correspondence between slots in the FlexE group and FlexE clients, or may represent a correspondence between slots in a PHY in the FlexE group and FlexE clients. For differentiation, in this specification, the slot configuration representing the correspondence between the slots in the FlexE group and the FlexE clients is referred to as a slot configuration table (calendar), and the slot configuration representing the correspondence between the slots in the PHY in the FlexE group and the FlexE clients is referred to as a slot configuration sub-table (sub-calendar). It should be understood that a mapping relationship between the slot and the PHY is recorded in the calendar or the sub-calendar. The calendar and the sub-calendar can be configured on a network management system. To facilitate reconfiguration of the slot, any PHY in the FlexE group supports two types of calendars, for example, a calendar A and a calendar B. The PHY works either in the calendar A or the calendar B.

That is, in a use process of the device, for example, the calendar A includes slot content, and is used in interaction. In this case, the device does not care whether the calendar B includes slot content. When a FlexE client needs to be added or deleted, or configuration of a FlexE client needs to be modified, configuration of a calendar (for example, the calendar B) that is not currently used may be modified, and then the currently used calendar A and the calendar B are switched, to add some FlexE clients to the FlexE group or delete some FlexE clients from the FlexE group, or modify configuration of a FlexE client that already exists in the FlexE group. For example, when the device performs switching negotiation with a peer device, the device updates the calendar B while running the calendar A, that is, fills the calendar B with an adjusted slot. Then, the device negotiates with the peer device about a time for switching the calendar A and the calendar B. When the negotiation succeeds, both the receive end and the transmit end switch to the calendar B. It should be understood that a switching time of the calendar may be negotiated between the receive end and the transmit end, to implement synchronous switching between the receive end and the transmit end. In this way, when service configuration of a client changes, a service of another client is not affected. Information such as a time for switching between the calendar A and the calendar B may be transferred by using the overhead code block.

Figure 6:
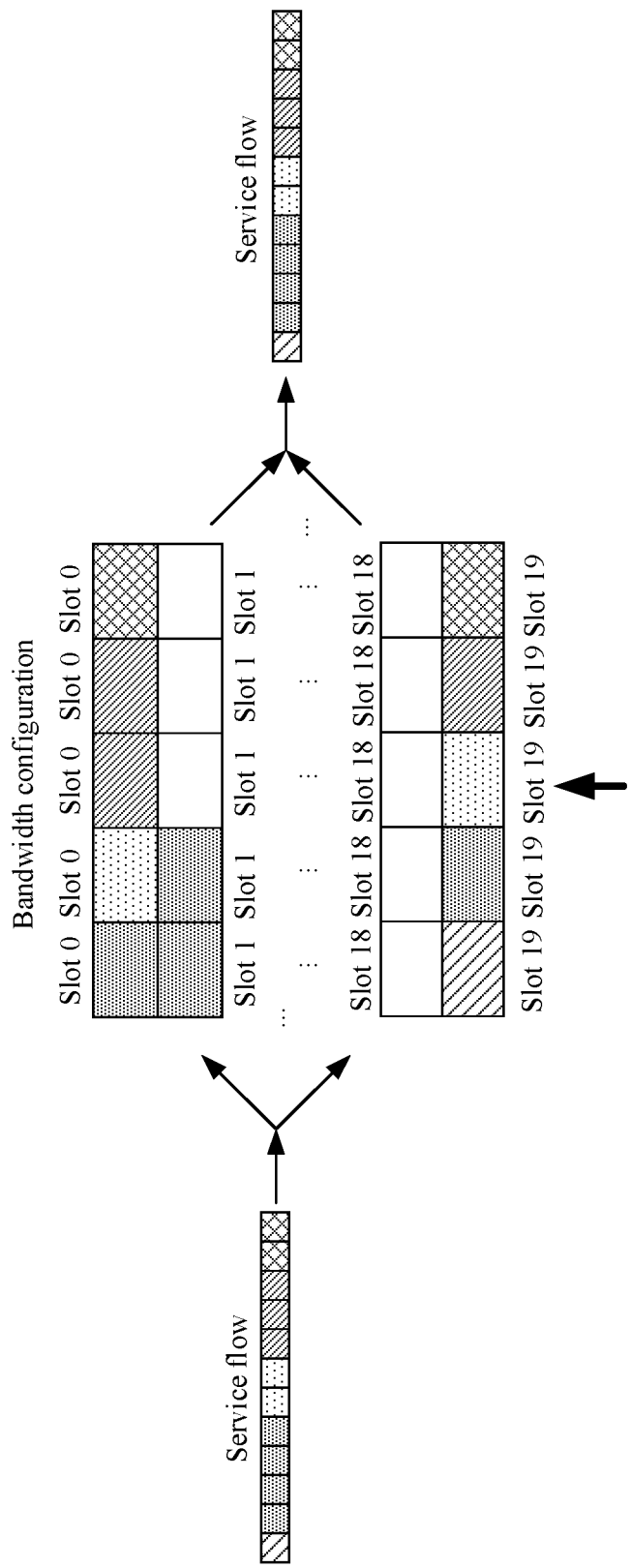
FIG. 6 is a schematic diagram of a time at which a transmit end and a receive end switch a calendar.

For ease of understanding, refer to FIG. 6. FIG. 6 is a schematic diagram of a time at which the transmit end and the receive end switch slot configuration (calendar). In the example in FIG. 6, a currently used calendar is a calendar A, a calendar that is not currently used is a calendar B, the calendar A configures a FlexE client to carry service data by using a slot 0 and a slot 19, and the calendar B configures a FlexE client to carry service data by using a slot 0, a slot 1, and a slot 19. When slot configuration of a FlexE client needs to be changed, the transmit end may switch from the calendar A to the calendar B at a moment (a moment indicated by a bold arrow in FIG. 6). To be specific, a service flow sent by the transmit end is first carried by using the slot 0 and the slot 19, and then is carried by using the slot 0, the slot 1, and the slot 19 from the moment indicated by the bold arrow in FIG. 6. Switching the service flow by the transmit end from the slot 0 and the slot 19 to the slot 0, the slot 1, and the slot 19 is actually implemented by inserting, for example, an idle code block into the service flow. It should be understood that only when the moment indicated by the bold arrow in FIG. 6 is known by the receive end, the received service flow can be correctly restored. Otherwise, the service flow restored by the receive end may lose service data, that is, service damage occurs.

However, the receive end cannot accurately identify the moment indicated by the bold arrow in FIG. 6. To avoid service damage, in some embodiments, the transmit end and the receive end may negotiate slot adjustment configuration. For example, the transmit end may send a calendar request (CR) message to the receive end, where the CR message carries slot configuration information, and the slot configuration information may be carried in the overhead code block. The receive end responds to the CR message and feeds back a calendar acknowledgment (CA) message to the transmit end, where the CA message may include information indicating to switch the slot configuration, so that the slot configuration is switched based on the CA message. Because the slot configuration information is carried by using the overhead code block, duration of one interaction between the transmit end and the receive end is duration for transmitting one FlexE basic frame. The transmit end and the receive end need to perform at least three interactions to negotiate a time for switching the slot configuration, which needs a long time. If there is another network node between the transmit end and the receive end, two adjacent nodes need to negotiate a time for switching the slot. An entire transmission link has a longer data transmission delay.

In addition, to avoid service damage, a buffer may be added to the transmit end. Before the slot configuration is switched, a valid data code block may be stored in the buffer. When the slot configuration is switched, an idle code block is inserted. In other words, in this case, the idle code block is actually transmitted between the transmit end and the receive end. After the slot configuration is switched, the transmit end may extract the buffered valid data code block and send the buffered valid data code block to the receive end, thereby avoiding service damage. In this method, the transmit end needs to provide a large buffer, so that the receive end and the transmit end have sufficient time to switch the slot configuration, which has a high requirement on the transmit end. In addition, the valid data code block is first buffered, and after the slot configuration is switched, the valid data code block is sent. This increases a data transmission delay, and cannot meet a low-delay requirement of the service. In addition, the transmit end and the receive end negotiate to switch the slot configuration by using the CR message and the CA message, which is actually slot configuration switching for the entire FlexE group. To be specific, if the slot configuration is switched, slot configuration of all FlexE clients is switched. It is clearly that a FlexE client whose slot configuration does not need to be changed is affected.

Due to existence of a plurality of network nodes, slot configuration needs to be switched hop by hop. As a result, the receive end cannot know an accurate time at which the transmit end switches the slot configuration, and cannot correctly restore data sent by the transmit end, thereby causing service damage. Therefore, in some other embodiments, an idle code block is inserted into a packet sent on a transmission path between two adjacent network nodes, and then the inserted idle code block is deleted at an egress of the transmission path. That is, a bandwidth of the transmission path is adjusted hop by hop to adjust a bandwidth of the entire transmission link. However, when the idle code block is inserted into the packet transmitted on the path, the idle code block may be inserted between two adjacent valid data code blocks, which does not match a packet format specified in the FlexE and 802.3 standards. In addition, the idle code block needs to be deleted at the egress of the path. For example, the packet is first buffered at the egress of the path, and then the idle code block in the packet is deleted, which needs a large buffer. In addition, the packet is first buffered, and then transmitted after the idle code block is deleted, which has a long delay.

In view of this, this embodiment of this application provides a service flow adjustment method and a communication apparatus, to unify times at which all nodes on a network switch slot configuration, so that the receive end correctly restores a data stream sent by the transmit end, thereby improving service data transmission reliability.

Figure 7:
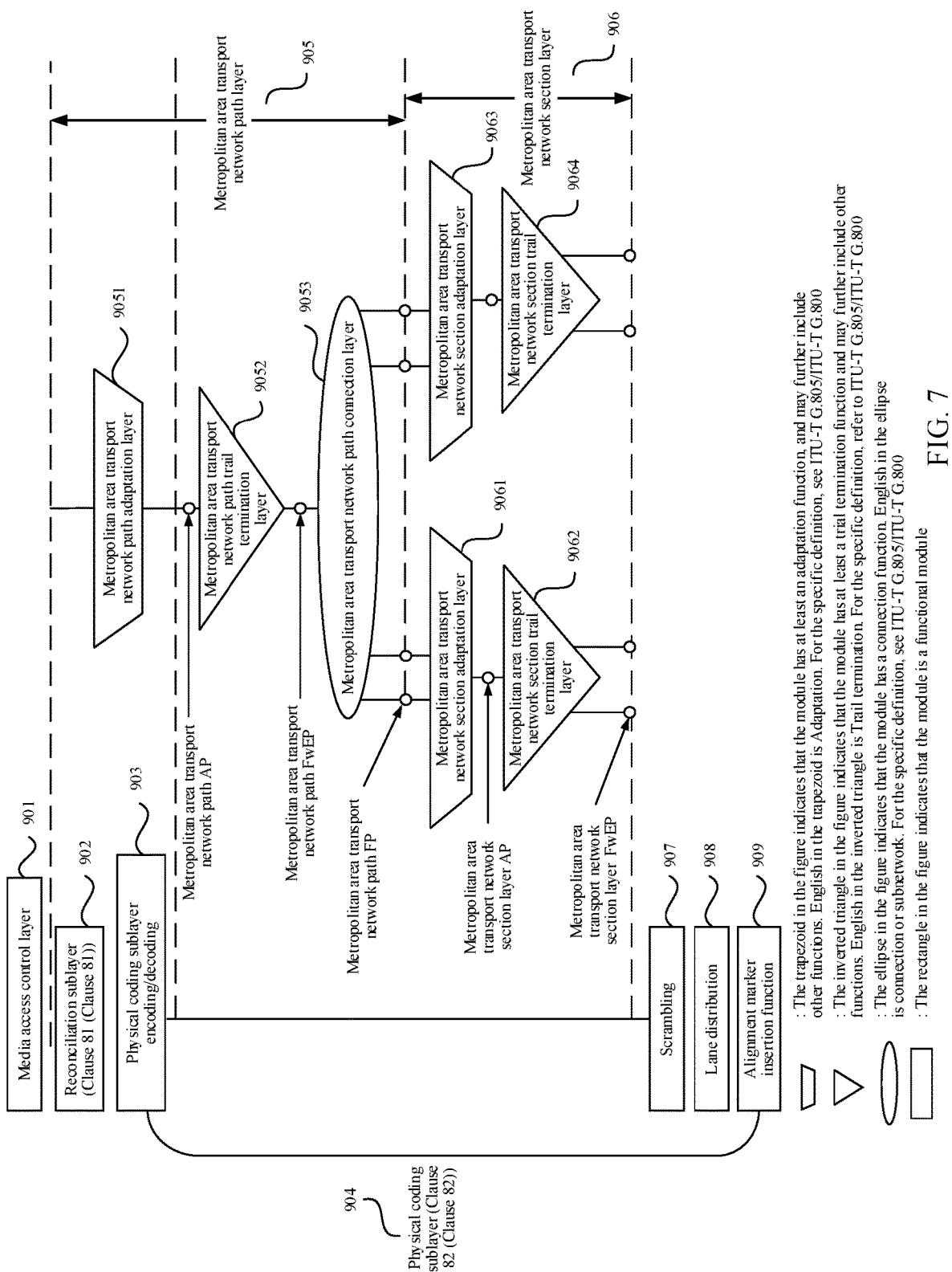
FIG. 7 is a schematic diagram of a new transport network layer network formed by an MTN section layer and an MTN path layer.

The technical solutions provided in this embodiment of this application may be applied to a flexible Ethernet, or may be applied to another type of network, for example, a metropolitan area transport network (Metro Transport Network, MTN). The MTN is a next-generation transport network technology system defined by ITU-T based on FlexE logic to meet requirements of new services such as 5G. Refer to FIG. 7. The MTN is a new transport network layer network formed by an MTN path layer 905 and an MTN section layer 906. The MTN path layer 905 includes an MTN path adaptation 9051, an MTN path trail termination function module 9052, an MTN path connection function module 9053, and the like. The MTN section layer 906 includes an MTN section adaptation function module and an MTN section trail termination function module. For example, the MTN section 906 may include an MTN section adaptation function module 9061 and an MTN section trail termination function module 9062. Alternatively, the MTN section layer 906 may include an MTN section adaptation function module 9063 and an MTN section trail termination function module 9064.

When a node is configured to send data, as shown in FIG. 7, a data stream received by the node successively passes through a MAC 901 and an RS 902, and enters the MTN path adaptation function module 9051 in an MTN domain. After being encoded by PCS encode/decode module 903 (in a data sending process, a PCS encode/decode module 903 is configured to perform encoding), a client signal is in a form of a 64B/66B code block stream. After the 64B/66B code block stream enters the MTN path trail termination function module 9052, overhead information such as path layer OAM is inserted into the code block stream, and a corresponding forwarding port and a corresponding slot are found by using the MTN path connection function module 9053. Then, the stream enters the MTN section adaptation function module 9061, and the stream is interleaved with another code block stream through rate adaptation. Overhead information such as section layer OAM is inserted into an interleaved code block stream at the MTN section trail termination function module 9062, and then the code block stream after adaptation enters a PHY bottom layer for transmission. After adaptation, the code block stream is transcoded from 64B/66B to 256B/257B. A transcoded code block stream is sent to a physical link for transmission.

In a sending process, the MTN path layer 905 may include a plurality of MTN path clients. The MTN path client is configured to adapt the client signal. The MTN path trail termination function module 9052 is configured to add some overhead information to the client signal. The overhead information added to the MTN path trail termination function module 9052 is referred to as first overhead information, and the first overhead information may include operation administration and maintenance (OAM) information. The MTN path connection function module 9053 is configured to find corresponding forwarding information for forwarding each code block stream, that is, find a correspondence between an egress port and an ingress port in the module, and find the egress port. The MTN path connection function module 9053 has one or more egress ports, and each egress port correspondingly outputs a plurality of MAC code block streams. Two egress ports are illustrated in FIG. 7. Each egress port outputs a plurality of MAC code block streams. A plurality of MAC code block streams output by one egress port enter the MTN section adaptation function module 9061, and a plurality of MAC code block streams output by the other egress port enter the MTN section adaptation function module 9063.

The MTN section adaptation function module 9061 is configured to perform adaptation from the MTN path layer 905 to the MTN section layer 906, and interleave the received code block streams. Herein, all MAC code block streams are interleaved into one code block stream. The MTN section adaptation function module 9062 is further configured to add second overhead information into the interleaved code block stream. The second overhead information in this embodiment of this application may include section layer OAM and other function overhead information. A scramble 907 is configured to scramble the interleaved code block stream. Through lane distribution 908 and an alignment marker (AM) insertion function 909, an encoding format is converted (for example, a 64B/66B code block stream is converted into a 256B/257B code block stream) by using forward error correction (FEC) code, and FEC encoding or decoding and error correction are performed on a code block stream obtained after the format is converted. It may also be described as follows: In a sending direction, the code block stream is sent to a lower layer after FEC encoding, and in a receiving direction, the code block stream is sent to an upper layer after FEC decoding and error correction. It should be understood that the MTN section adaptation function module 9063 and the MTN section adaptation function module 9061 perform similar processing.

On the contrary, if the node is configured to receive a data stream, a flow direction of the data stream received by the node is opposite to a flow direction of the foregoing sent data stream. For example, the data stream received by the node sequentially passes through, for example, the MTN section layer 906 and the MTN path layer 905. It should be understood that, in a receiving process, encoding format conversion is first performed on the data stream (for example, a 256B/257B code block stream is converted into a 64B/66B code block stream). Then, the stream enters the MTN section layer, and after being processed and de-interleaved by the section layer, the stream is restored to individual 64B/66B MAC code block streams at the MTN section adaptation function module 9063. Then, each 64B/66B code block stream is forwarded at the MTN path connection function module 9053, and details are not described herein again.

The MTN is a next-generation transport network technology system defined by ITU-T based on FlexE logic to meet requirements of new services such as 5G. From a perspective of protocol stack, the MTN section layer 906 is similar to an OIF FlexE shim in terms of functions. The current version of the MTN section layer is compatible with the FlexE, and a frame format of the current version of the MTN section layer retains a FlexE frame format. Because the MTN section layer frame format retains the FlexE frame format, the MTN is similar to the FlexE. If there are a plurality of MTN section layers between the transmit end and the receive end, and slot configuration needs to be switched between the plurality of MTN section layers, the receive end does not know a time for switching the slot configuration of each MTN section layer either. As a result, the receive end cannot correctly restore the data sent by the transmit end, and a service network is damaged.

In this embodiment of this application, times at which all nodes on a network switch slot configuration can be unified. Therefore, this embodiment of this application is applied to an MTN network, so that the receive end can correctly restore the data stream sent by the transmit end, thereby improving service data transmission reliability. In addition, it should be noted that this embodiment of this application may also be applied to an Ethernet, an optical transport network (OTN) network, a synchronous digital hierarchy (SDH) network, a network that has a FlexE feature and allows data unit addition or deletion in a transmission process of a service signal flow, or the like. For ease of description, embodiments of this application are mainly described by using the flexible Ethernet as an example.

Figure 8A:
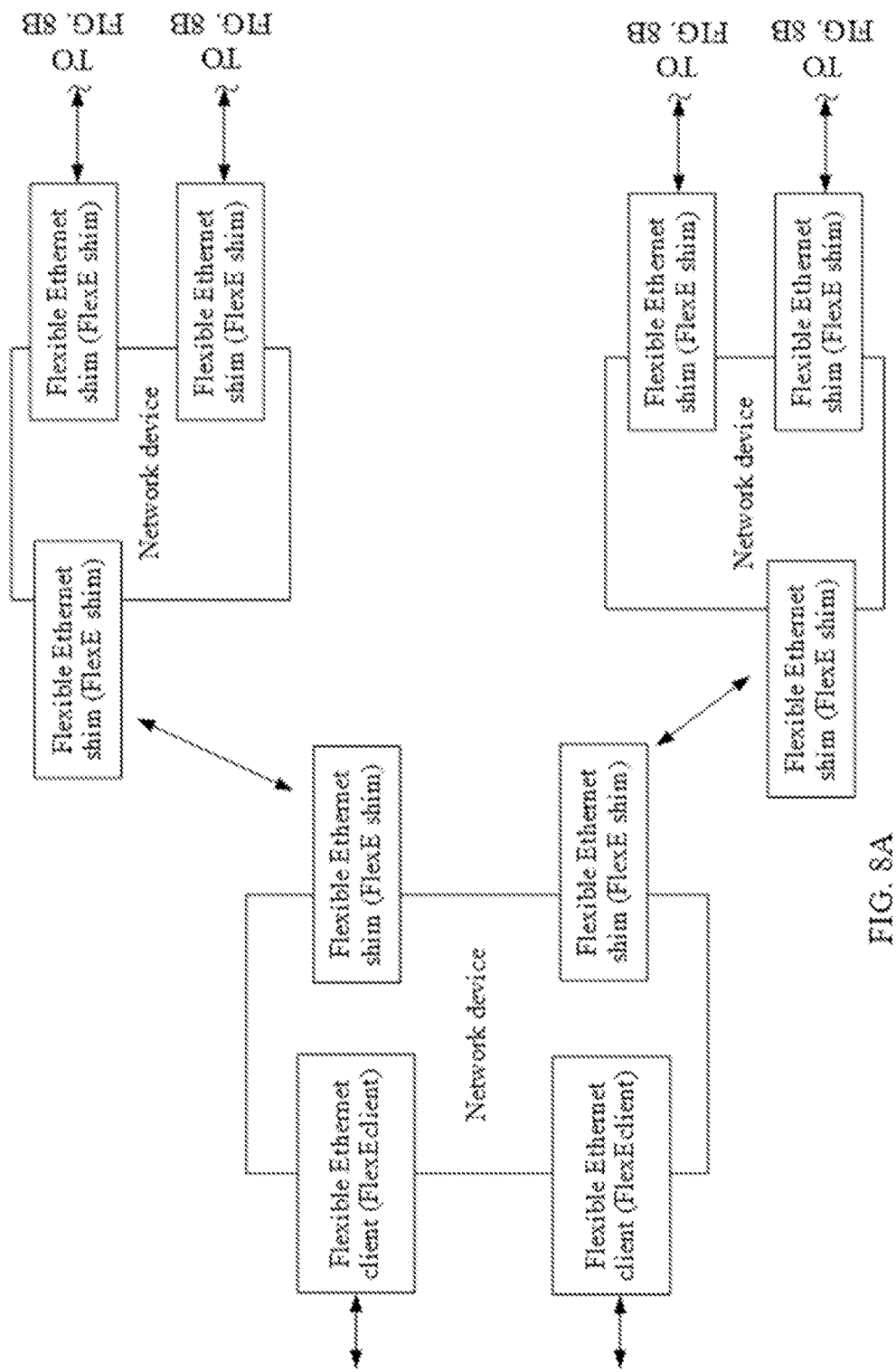
FIG. 8A and FIG. 8B are a schematic diagram of a network architecture of an applicable communication system according to an embodiment of this application.
Figure 8B:
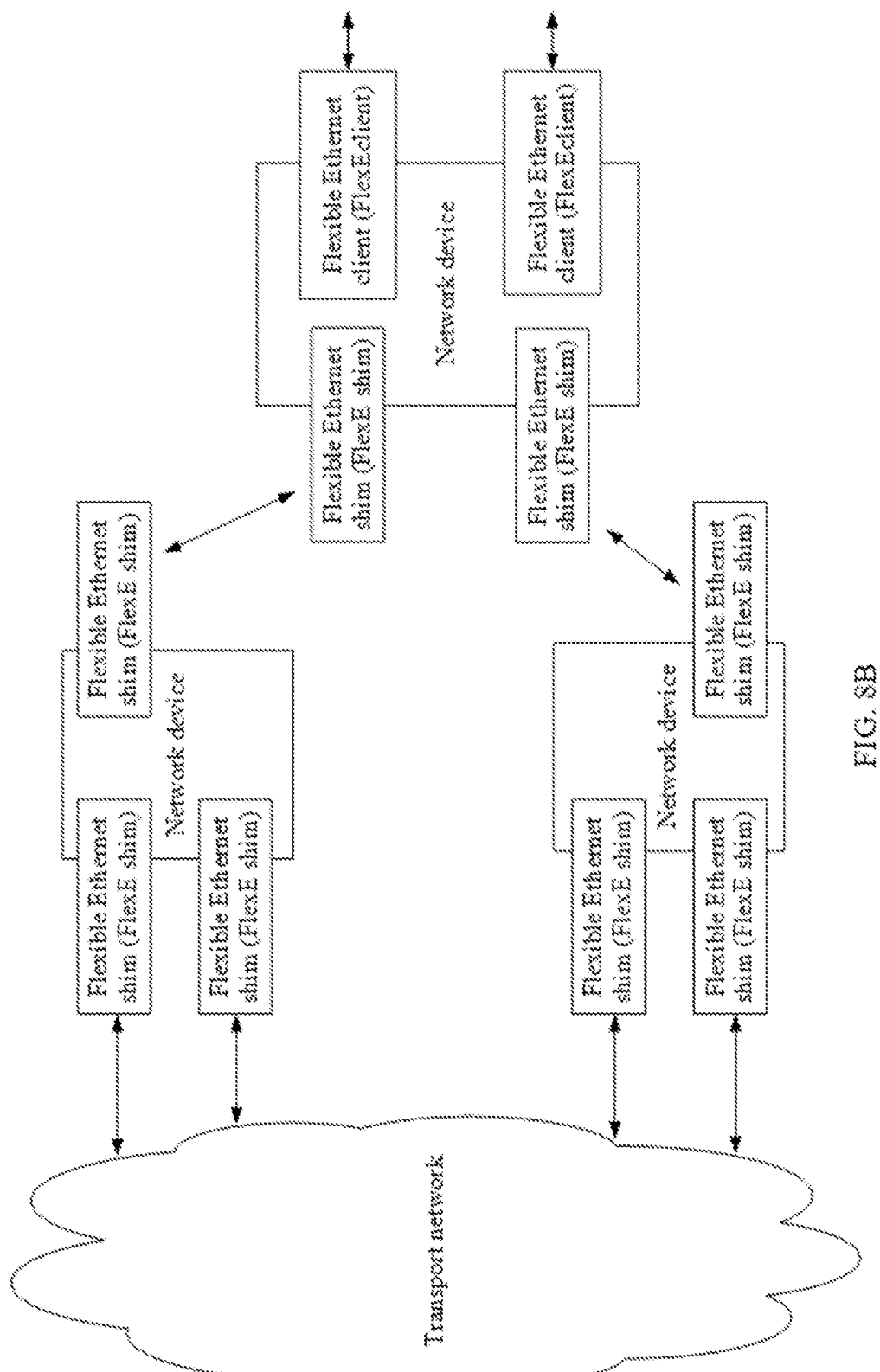

FIG. 8A and FIG. 8B show an example of a schematic diagram of an architecture of a communication system to which embodiments of this application are applicable. As shown in FIG. 8A and FIG. 8B, a transmission link between a transmit end (which may also be referred to as a FlexE client) and a receive end (a FlexE client) may include a plurality of network devices (which may also be referred to as nodes), and the FlexE client performs transmission by using a FlexE interface-based network. The network device in FIG. 8A and FIG. 8B may provide a FlexE interface. The FlexE interface may be implemented by using a FlexE shim. FlexE interfaces implemented by two network devices by using the FlexE shim may be considered as a FlexE group. The network device may be a switch, a router, a packet transport network (PTN), an agile transport network (ATN), a slicing packet network (SPN), or the like. It should be understood that the transmission link between the transmit end and the receive end relates to the plurality of network devices, and there are a plurality of FlexE groups. When a bandwidth of the transmission link is adjusted, slot configuration of a plurality of FlexE groups needs to be modified, that is, when the bandwidth of the transmission link is adjusted, a bandwidth between the plurality of network devices needs to be adjusted. It should be noted that FIG. 8A and FIG. 8B merely use an example in which six network devices are included. Actually, more or fewer network devices may be included between the transmit end and the receive end.

It should be understood that, if the FlexE client of the transmit end and the FlexE client of the receive end each may be an MTN path in FIG. 8A and FIG. 8B, correspondingly, a FlexE group in FIG. 8A and FIG. 8B is an MTN section group, and when a bandwidth of the MTN path is adjusted, bandwidths of a plurality of MTN section groups need to be adjusted.

Figure 9:
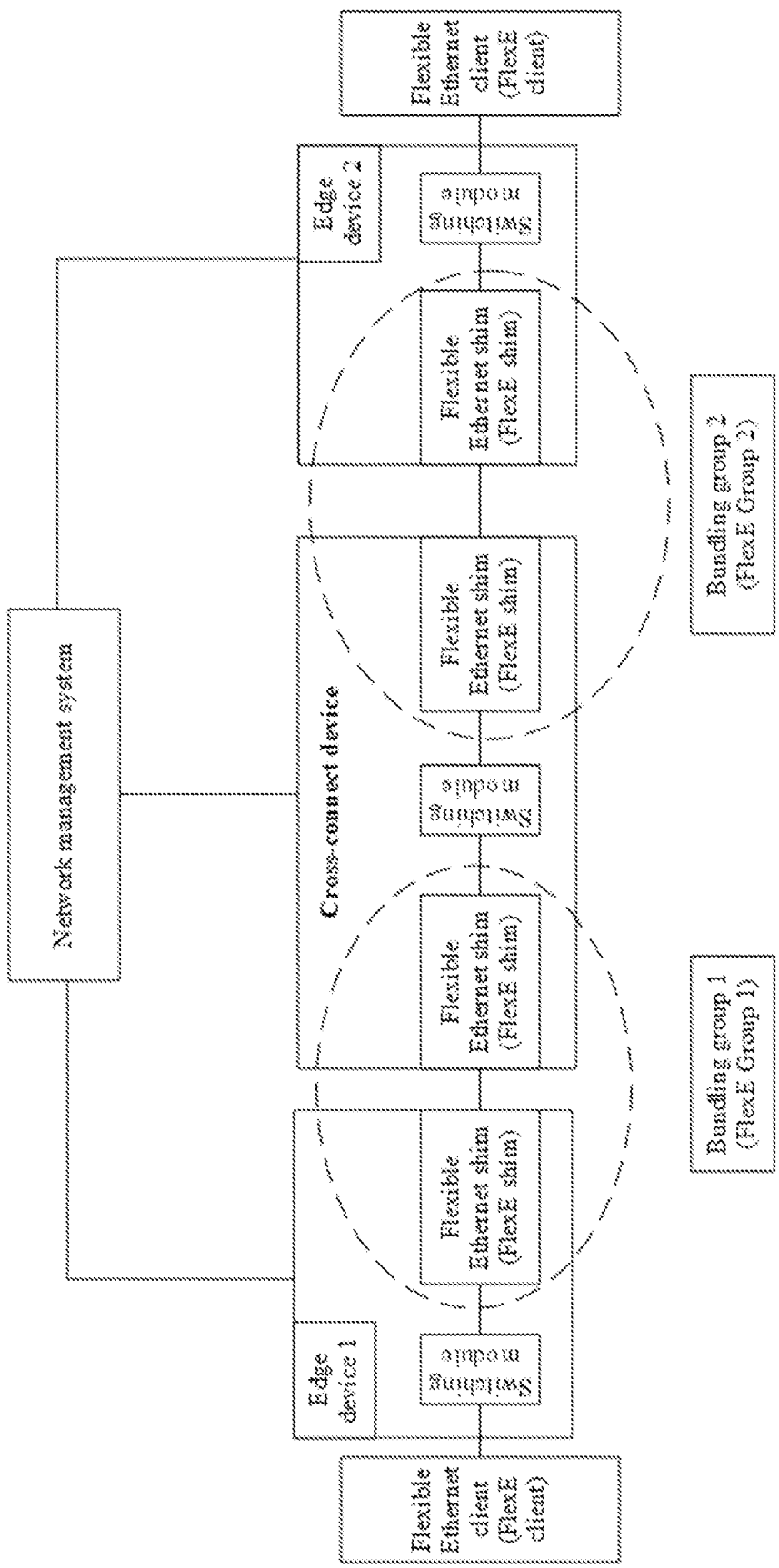
FIG. 9 is another schematic diagram of a network architecture of an applicable communication system according to an embodiment of this application.

FIG. 9 is a schematic diagram of an architecture of another communication system to which embodiments of this application are applicable. In FIG. 9, a communication system including three nodes is used as an example. The three nodes are respectively a provider edge (PE) node 1, a provider node, and a provider edge node 2. A network management system may manage the provider edge node 1, the provider node, and the provider edge node 2. For example, the network management system may configure slot configuration for the provider edge node 1, the provider node, or the provider edge node 2. It should be understood that FIG. 11 uses an example in which one provider node is located between two provider edge nodes. In actual application, FIG. 9 may further include more provider nodes. The provider edge node 1 may be configured to receive a service flow sent by the FlexE client, and complete, by using the FlexE shim, data adaptation and conversion of the service flow from the FlexE client to the MAC client. The provider node may be configured to complete service flow switching between a FlexE Group 1 and a FlexE Group 2. The provider edge node 2 is configured to complete data adaptation and conversion from the MAC client to the FlexE client, and send the service flow to the FlexE client. It should be understood that switching modules in the provider edge node 1, the provider node, and the provider edge node 2 may be configured to complete clock domain switching in the data adaptation and conversion process.

It should be understood that, for an MTN system architecture, an MTN section is similar to the FlexE shim in FIG. 9 in terms of functions, and the switching module may be understood as one or more functional units in the MTN section and/or an MTN path.

According to the solution provided in this embodiment of this application, times for adjusting bandwidths of all nodes on the network may be unified, that is, times for adjusting bandwidths of all nodes in the transmission link of the network are negotiated. In this case, for the receive end, the service flow sent by the transmit end may be correctly restored based on the time, thereby avoiding service damage.

Figure 10:
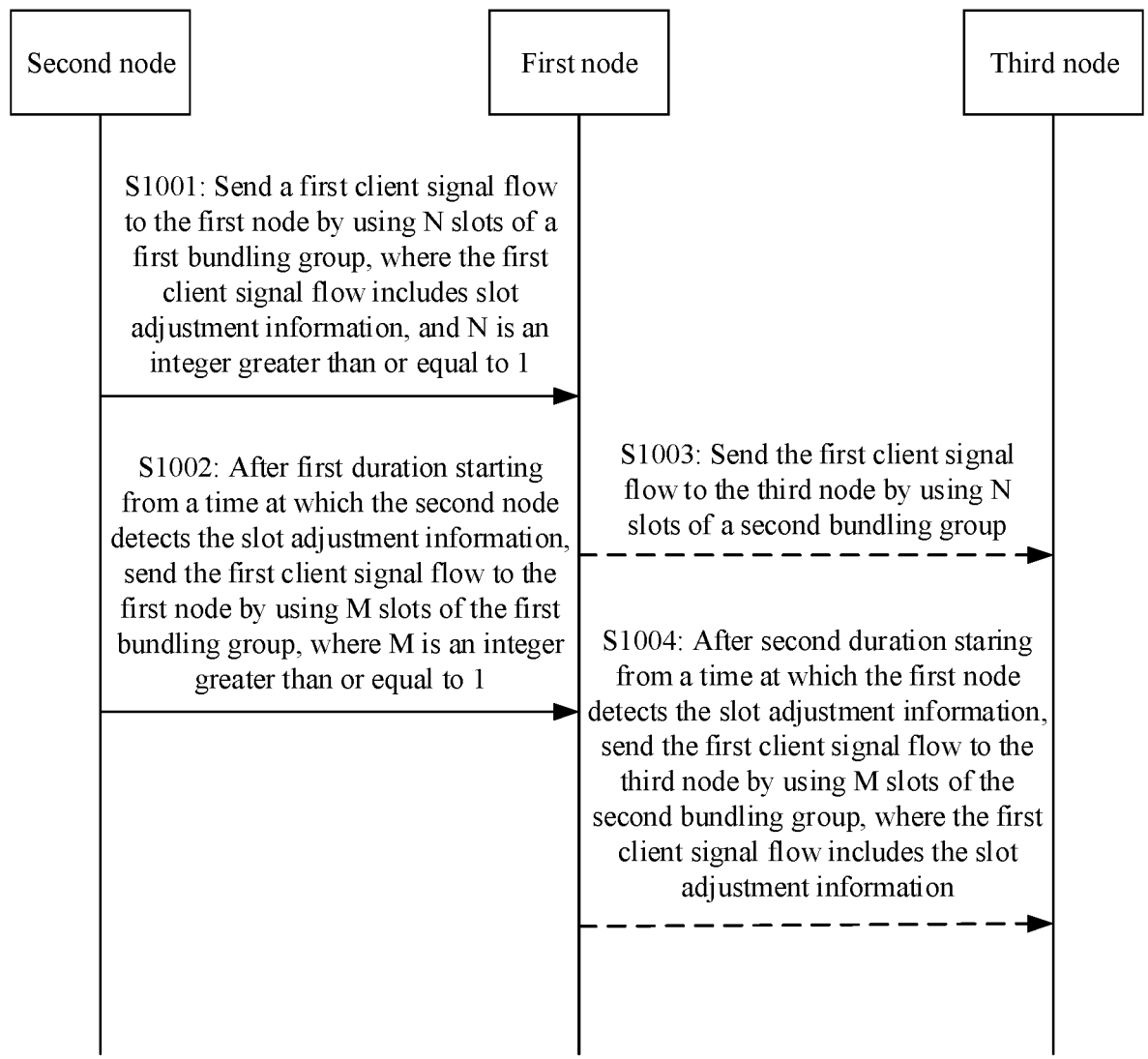
FIG. 10 is a schematic flowchart of an example of a service flow adjustment method according to an embodiment of this application.

FIG. 10 is a flowchart of a service flow adjustment method according to an embodiment of this application. The service flow adjustment method may be applied to the communication systems shown in FIG. 8A and FIG. 8B and FIG. 9. The service flow adjustment method may be executed by at least two communication apparatuses. If the service flow adjustment method is executed by two communication apparatuses, it may be considered that the communication system includes two nodes, that is, includes only a transmit node (the transmit end) and a receive node (the receive end). If the service flow adjustment method is executed by at least three communication apparatuses, it may be considered that the communication system includes at least three nodes. That is, in addition to a transmit node (the transmit end) and a receive node (the receive end), the communication system further includes an intermediate node located between the transmit node and the receive node.

In the following description, in an example in FIG. 9, the service flow adjustment method is used to describe the solutions provided in embodiments of this application. For ease of description, the provider node in FIG. 9 is referred to as a first node, the provider edge node 1 is referred to as a second node, and the provider edge node 3 is referred to as a third node. The second node may be an upper-level node of the first node, and the first node may be an upper-level node of the third node. In other words, the first node is a lower-level node of the second node, and the first node is an upper-level node of the third node. That is, a flow direction of a service flow in a transmission link is from the second node to the first node, and then to the third node, which is used as an example in the following.

Specifically, a procedure of the service flow adjustment method provided in this embodiment of this application is described as follows.

S1001: The second node sends a first client signal flow to the first node by using N slots of a first bundling group, where the first client signal flow includes slot adjustment information, and N is an integer greater than or equal to 1. It should be noted that the first node receives the first client signal flow by using the N slots of the first bundling group.

S1002: After first duration starting from a time at which the second node detects the slot adjustment information, the second node sends the first client signal flow to the first node by using M slots of the first bundling group, and the first node receives the first client signal flow by using the M slots of the first bundling group, where M is an integer greater than or equal to 1.

This embodiment of this application intends to unify times for adjusting bandwidths of all nodes (for example, the first node and the second node) on a network. In this way, the nodes can implement synchronous bandwidth adjustment, that is, bandwidths at the receive end and the transmit end are synchronously adjusted, thereby avoiding service damage in the bandwidth adjustment process.

In an example, the first node and the second node each may implement bandwidth adjustment by switching currently used bandwidth configuration. For example, there are two types of bandwidth configuration, which separately indicate a mapping relationship between a PHY and bandwidth. Bandwidths of the two types of bandwidth configuration may be the same or may be different. The bandwidth configuration may be slot configuration, for example, the foregoing calendar A or the foregoing calendar B, or may be another possible bandwidth configuration. In the following description, an example in which the bandwidth configuration is the slot configuration is used, and an example in which there are two types of slot configuration of the calendar A and the calendar B is used. The first node and the second node each may implement bandwidth adjustment by switching currently used slot configuration. For example, a mapping relationship that is between a PHY and a slot and that is indicated by the calendar A is that service data is carried in N slots, and a mapping relationship that is between a PHY and a slot and that is indicated by the calendar B is that service data is carried in M slots. Slot configuration currently used by each the first node and the second node is the calendar A. In this case, the first node and the second node each may switch from the calendar A to the calendar B, to implement the bandwidth adjustment. It should be understood that both N and M are integers greater than or equal to 1.

Values of N and M are not limited in this embodiment of this application. For example, M may be greater than N, that is, a bandwidth of a transmission channel needs to be increased. For example, for the calendar A, the N slots carrying the service data are configured as a slot 0 and a slot 1, and for the calendar B, the M slots carrying the service data are configured as a slot 0, a slot 1, and a slot 19, that is, N is equal to 2, and M is equal to 3. In this case, the first client signal flow indicates that a bandwidth of a transmission channel is increased, to transmit, for example, service data having a high delay requirement. The M slots and the N slots may include slots at a same location, for example, the slot 0 and the slot 1. Alternatively, the M slots and the N slots may include slots at completely different locations. For example, the N slots are the slot 0 and the slot 1, and the M slots are the slot 0, the slot 1, and the slot 19.

For example, M may also be less than N, that is, a bandwidth of a transmission channel needs to be reduced. For example, for the calendar A, the N slots carrying the service data are configured as a slot 0, a slot 1, and a slot 19, and for the calendar B the M slots carrying the service data are configured as a slot 0 and a slot 1, that is, N is equal to 3, and M is equal to 2. In this case, the first client signal flow indicates that a bandwidth of a transmission channel is reduced, and bandwidth resources are saved as many as possible while reliable transmission of the service data is ensured. Similarly, the M slots and the N slots may include slots at a same location, for example, the slot 0 and the slot 1. Alternatively, the M slots and the N slots may include slots at completely different locations. For example, the N slots are the slot 0, the slot 1, and the slot 19, and the M slots are the slot 0 and the slot 1.

For example, M may be equal to N, and a location of at least one of the M slots is different from a location of at least one of the N slots. That is, the bandwidth of the transmission channel is maintained, but a location of at least one of the M slots or the N slots is adjusted, so that network bandwidth fragmentation can be avoided, and an operator can optimize bandwidth resources. For example, for the calendar A, the N slots carrying the service data are configured as a slot 0, a slot 1, and a slot 19, and for the calendar B, the M slots carrying the service data are configured as a slot 0, a slot 1, and a slot 3, that is, N is equal to 3, and M is equal to 3.

It should be understood that the first node and the second node are currently using the calendar A. In this case, the second node may send the service data to the first node by using the N slots of the first bundling group between the second node and the first node. In other words, the first node receives the service data by using the N slots of the first bundling group. It should be understood that the first bundling group includes P PHY links, a bandwidth resource of each PHY link is divided into Q slots, bandwidth resources of the first bundling group are divided into P×Q slots. It should be understood that N, P, and Q are all integers greater than or equal to 1. For example, P is equal to 4, Q is equal to 20, and N is equal to 3. It should be noted that values of N, P, and Q herein are merely examples.

In this embodiment of this application, in addition to sending the service data to the first node by using the N slots of the first bundling group, the second node may further send slot adjustment information to the first node. The slot adjustment information may be used to indicate a time for adjusting a bandwidth by the first node. For example, after first duration starting from a time at which the first node detects the slot adjustment information, the first node switches the slot configuration. For the second node, similarly, after first duration starting from a time at which the second node detects the slot adjustment information, the second node switches the slot configuration. In other words, after the first duration starting from the time at which the first node and the second node each detect the slot adjustment information, the first node and the second node each switch from the calendar A to the calendar B, so that synchronous bandwidth adjustment can be implemented. It should be noted that, because the slot adjustment information indicates the time for adjusting the bandwidth, in some embodiments, the slot adjustment information is also referred to as bandwidth adjustment information.

For example, the slot adjustment information may be sent to the first node together with the service data sent by the second node to the first node. In this specification, the data stream including the service data and the slot adjustment information is referred to as the first client signal flow. That is, the second node sends a first client signal flow to the first node by using N slots of a first bundling group, where the first client signal flow includes slot adjustment information, and the first node receives the first client signal flow by using the N slots of the first bundling group. After first duration starting from a time at which the first node detects the slot adjustment information in the first client signal flow, the first node switches from the calendar A to the calendar B. It should be understood that the first client signal flow is always transmitted, and if the second node detects the slot adjustment information in a process of sending the first client signal flow to the first node, after the first duration, the second node also switches from the calendar A to the calendar B. After the first duration, the second node sends the first client signal flow to the first node by using M slots of the first bundling group, and the first node may receive the first client signal flow by using the M slots of the first bundling group.

S1003: The first node sends the first client signal flow to a third node by using N slots of a second bundling group.

S1004: After second duration starting from a time at which the first node detects the slot adjustment information, the first node sends the first client signal flow to the third node by using M slots of the second bundling group, where the first client signal flow includes the slot adjustment information.

In some embodiments, when there are at least three nodes on the network, for example, in addition to the first node and the second node, the network may further include the third node. The third node communicates with the first node by using the second bundling group. It should be understood that the second bundling group may be the same as the first bundling group. To be specific, the second bundling group includes P PHY links, and a bandwidth resource of each PHY link is divided into Q slots, that is, bandwidth resources of the second bundling group is divided into P×Q slots. Alternatively, the second bundling group may be different from the first bundling group. For example, the second bundling group includes L PHY links, and a bandwidth resource of each PHY link is divided into K slots, that is, bandwidth resources of the second bundling group is divided into L×K slots. It should be noted that the bandwidth resources of the second bundling group are not limited in this embodiment of this application. For example, the bandwidth resources of the second bundling group may be greater than or equal to the bandwidth resources of the first bundling group, or may be less than the bandwidth resources of the first bundling group, provided that the second bundling group can provide bandwidth resources of M slots.

The first client signal flow may be sequentially sent to the first node and the third node starting from the second node, that is, an initial node. Because the slot adjustment information is sent together with the first client signal flow, the first client signal flow passes through each node, and after preset duration starting from a time at which each node detects slot adjustment information, each node switches from a calendar A to a calendar B, so that times for switching slot configuration can be unified. The receive end may restore, based on the first duration, service data sent by the transmit end, to avoid service damage. In this embodiment of this application, two adjacent nodes do not need to negotiate, by exchanging a CR message and a CA message, a time for switching slot configuration, which can reduce a delay. In addition, there is no need to add a large buffer to the transmit end to avoid service damage, thereby reducing a buffer requirement on the transmit end. In addition, in this embodiment of this application, data does not need to be first buffered at an egress of a path, thereby reducing a buffer requirement on the node.

It should be understood that, because the first client signal flow is always transmitted, there may be a difference between moments at which all nodes detect slot adjustment information. This embodiment of this application intends to unify moments at which all nodes switch slot configuration. Therefore, duration from a moment at which each node detects the slot adjustment information to a moment at which each node switches slot configuration is different. That is, strictly, after different duration starting from the time at which each node detects the slot adjustment information, each node switches slot configuration at a same moment.

Specifically, the first node receives the first client signal flow from the second node by using the N slots of the first bundling group, and after the first duration starting from a time at which the first node detects the slot adjustment information, the calendar A is switched to the calendar B at a receive port of the first node. That is, after the first duration, the first node receives the first client signal flow from the second node by using the M slots of the first bundling group. In addition, after the second duration, the calendar A is switched to the calendar B at a transmit port of the first node. That is, after the second duration, the first node sends the first client signal flow to the third node by using the M slots of the second bundling group, where the first client signal flow includes the slot adjustment information. It should be understood that before the first duration, the first node sends the first client signal flow to the third node by using the N slots of the second bundling group.

For ease of understanding, the following uses the first node as an example to describe a time for switching slot configuration by the first node with reference to specific accompanying drawings and examples. It should be understood that the first node is a node having a transmit port and a receive port. That the first node switches the slot configuration means that, for example, the calendar A is switched to the calendar B at the transmit port of the first node and the calendar A is switched to the calendar B at the receive port of the first node.

Figure 11:
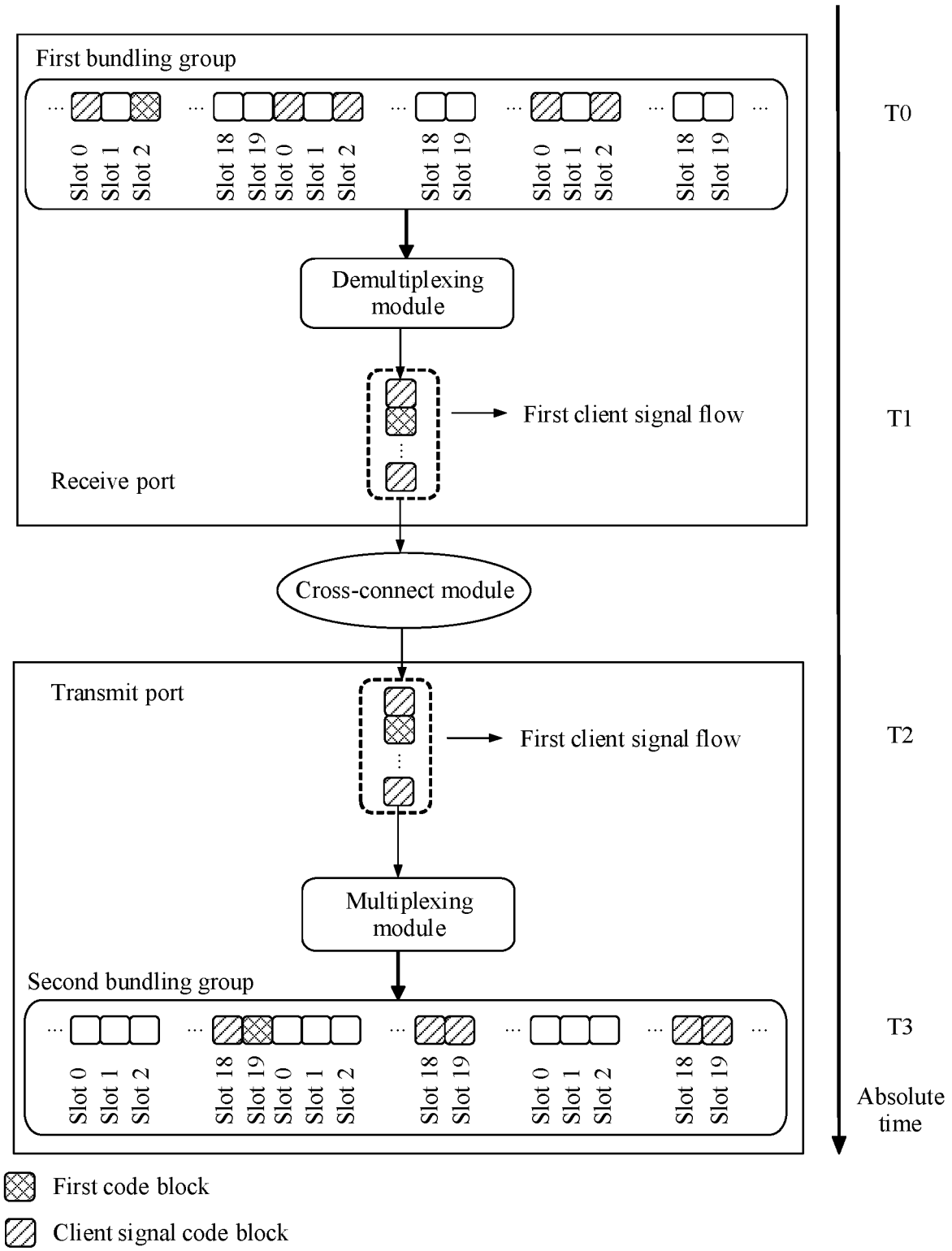
FIG. 11 is a schematic diagram of determining, by a first node, a starting point of first duration according to an embodiment of this application.

FIG. 11 is a schematic diagram of a first client signal flow passing through a first node. It should be understood that, in FIG. 11, a demultiplexing module is configured to restore a first client signal flow from a slot, and a multiplexing module is configured to add a first client signal flow to a slot. A first code block in FIG. 11 is a code block carrying slot adjustment information. In the example in FIG. 11, a client signal is carried in a slot 0 and a slot 1. Blank code blocks are code blocks other than the client signal and the first code block, and include an overhead code block, an idle code block, and the like. A moment T0 is a moment at which the first node detects the first code block (that is, the slot adjustment information) in a first bundling group. A moment T1 is a moment at which the slot adjustment information is detected at the receive port after the received first client signal flow is restored and before the signal flow passes through a cross-connect module. A moment T2 is a moment at which the slot adjustment information is detected after the first client signal flow passes through the cross-connect module. T3 is a moment at which the first node detects the slot adjustment information in a second bundling group.

Any one of T0 to T3 may be used as a starting point of first duration at the receive port of the first node. Similarly, any one of T0 to T3 may be used as a starting point of second duration at the transmit port of the first node. If different moments are selected at the transmit port and the receive port, the first duration and the second duration are also different. To be specific, in this embodiment of this application, switching duration respectively corresponding to the transmit end and the receive end may be set based on a difference between T1 and T3, to compensate for a difference between times for switching the slot configuration by the transmit end and the receive end, so that the transmit end and the receive end switch the slot configuration at a same moment, and times for overall switching slot configuration by the first node are one moment. For example, T1 is selected at the receive port, T3 is selected at the transmit port, and a difference between the first duration and the second duration is T3−T1.

For example, the first client signal flow is always transmitted, and the first client signal flow is transmitted from the receive port of the first node to the transmit port of the first node after passing through the cross-connect module. When the slot adjustment information is detected at the receive port, the receive end starts timing, and switches the slot configuration after the first duration. When the slot adjustment information is detected at the transmit port, the transmit end also starts timing, and switches the slot configuration after the second duration. If a moment, for detecting the slot adjustment information, selected at the receive port and a moment, for detecting the slot adjustment information, selected at the transmit port are consistent, the first duration is the same as the second duration, and the slot configuration is simultaneously switched at the transmit port and the receive port. If a moment, for detecting the slot adjustment information, selected at the receive port and a moment, for detecting the slot adjustment information, selected at the transmit port are not consistent, the first duration is different from the second duration. When the first client signal flow is sent, a buffer may be set at the transmit port to compensate for a difference between times for switching the slot configuration at the receive port and the transmit port, thereby implementing synchronous switching between the receive port and the transmit port.

Figure 12:
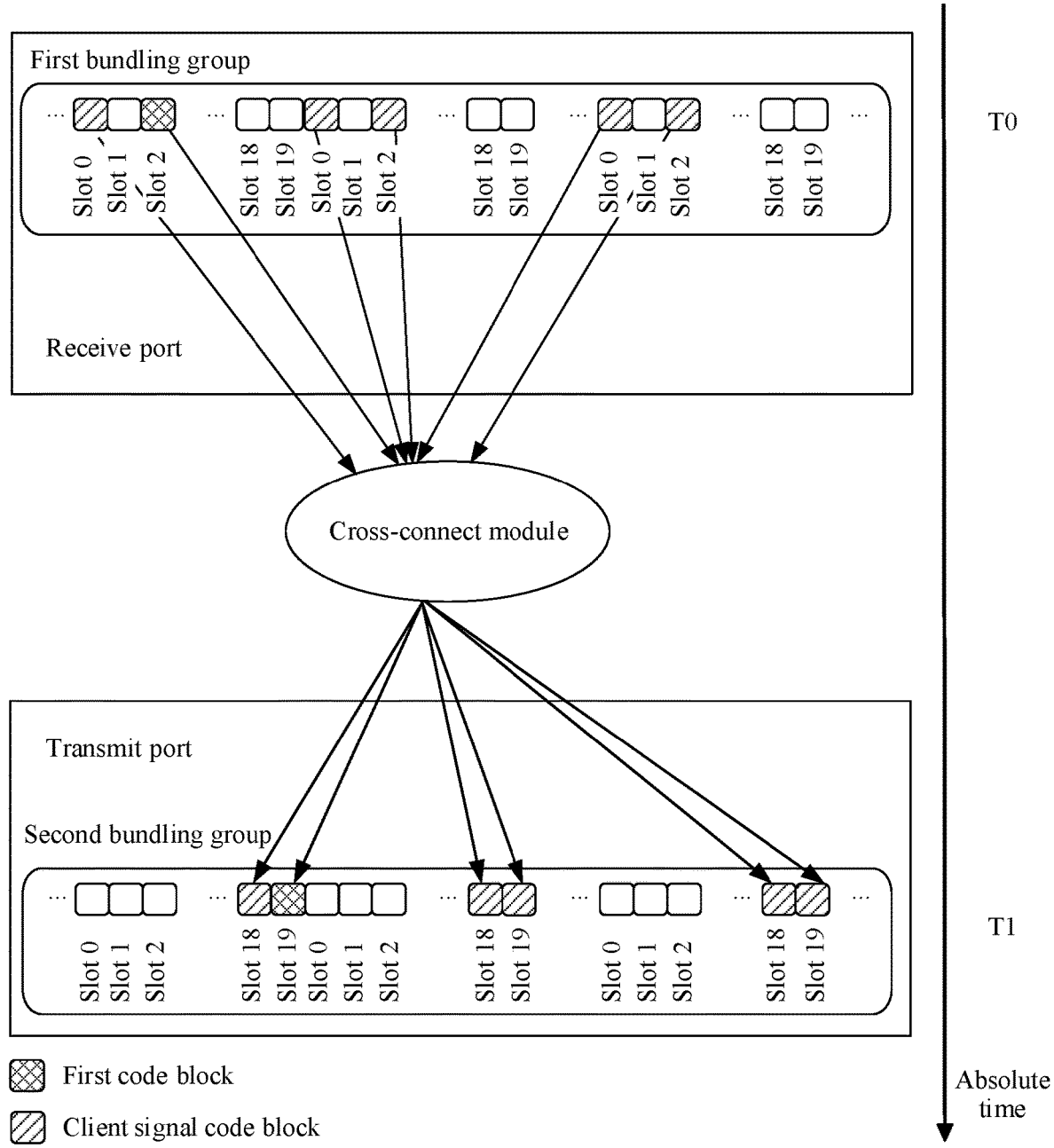
FIG. 12 is another schematic diagram of determining, by a first node, a starting point of first duration according to an embodiment of this application.

FIG. 12 is another schematic diagram of a first client signal flow passing through a first node. FIG. 12 is similar to FIG. 11. A first code block is a code block carrying slot adjustment information, and blank code blocks include an overhead code block, an idle code block, and the like. A difference between FIG. 12 and FIG. 11 lies in that FIG. 12 shows another cross-connect (slot cross-connect) implementation, of a received client signal flow, from the first node. As shown in FIG. 12, the first node cross-connects a slot 0 of a first bundling group at a receive port to a slot 18 of a second bundling group at a transmit port, and cross-connects a slot 2 of the first bundling group at the receive port to a slot 19 of the second bundling group at the transmit port. A moment T0 is a moment at which the first node detects the slot adjustment information in the first bundling group, and a moment T1 is a moment at which the first node detects the slot adjustment information in the second bundling group.

T0 or T1 may be used as a starting point of the first duration at the receive port of the first node. Similarly, T0 or T1 may also be used as a starting point of the second duration at the transmit port of the first node. If a moment, for detecting the slot adjustment information, selected at the receive port and a moment, for detecting the slot adjustment information, selected at the transmit port are different, the first duration and the second duration are also different. In this embodiment of this application, switching duration (the first duration or the second duration) respectively corresponding to the transmit port and the receive port may be set based on a difference between T0 and T1, to compensate for a difference between times for switching the slot configuration at the transmit port and the receive port, so that the slot configuration is switched at the transmit end and the receive end at a same moment, and times for overall switching slot configuration by the first node are one moment. For example, T1 is selected at the transmit port, T0 is selected at the receive port, and a difference between the first duration and the second duration is T1−T0.

It should be noted that S1003 and S1004 are not indispensable steps, and therefore are shown by using dashed lines in FIG. 10. In addition, a sequence of S1002 and S1004 is not limited in this embodiment of this application, and is described below in a related embodiment.

Because it takes the transmit port and the receive port of each node on a network some time to switch from the calendar A to the calendar B or from the calendar B to the calendar A, the time is referred to as a configuration switching time in this specification. Different nodes correspond to different configuration switching capabilities due to hardware implementation or other possible factors. Correspondingly, different nodes correspond to different minimum configuration switching duration. It should be understood that, for one node, minimum configuration switching duration of the node is longest duration in minimum configuration switching duration of a transmit port of the node and minimum configuration switching duration of a receive port of the node. The first duration needs to meet minimum configuration switching duration of all nodes on the network, that is, the first duration needs to be greater than or equal to longest duration in respective minimum configuration switching duration corresponding to all the nodes on the network.

Figure 13:
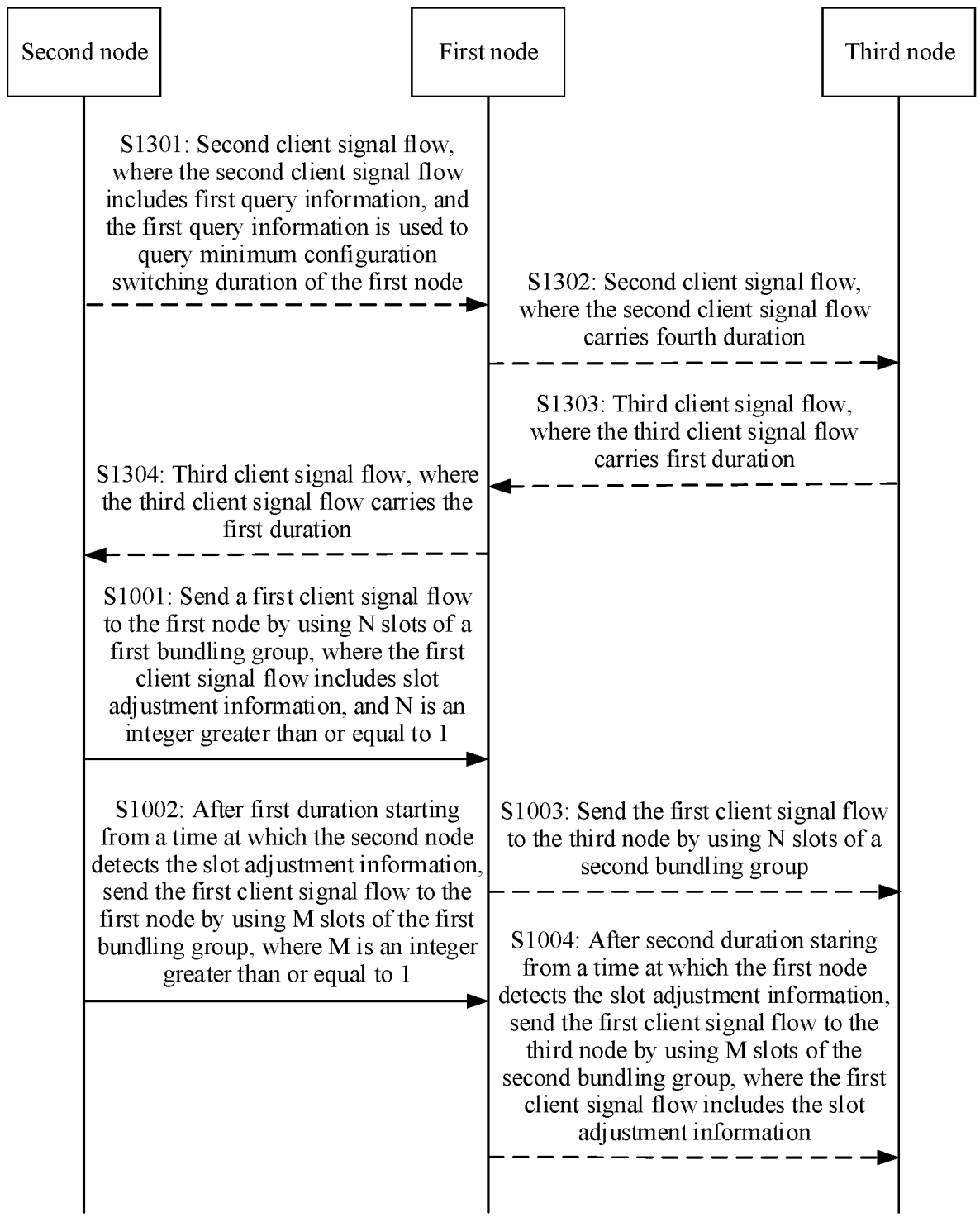
FIG. 13 is a schematic flowchart of an example of a service flow adjustment method according to an embodiment of this application.

Therefore, the first duration needs to be determined. FIG. 13 is a flowchart of an example of a service flow adjustment method according to an embodiment of this application.

S1301: The second node sends a second client signal flow to the first node, where the second client signal flow is used to query minimum configuration switching duration of the first node.

It should be understood that the first node may include a receive port. In this case, the minimum configuration switching duration is shortest duration required by the first node to switch from receiving the first client flow by using the N slots to receiving the first client flow by using the M slots. If the first node includes a transmit port and a receive port, in this case, the minimum configuration switching duration is longest duration in the shortest duration required by the first node to switch from receiving the first client flow by using the N slots to receiving the first client flow by using the M slots and shortest duration required by the first node to switch from sending the first client signal flow by using the N slots to sending the first client signal flow by using the M slots.

Query information in the second client signal flow sent by the second node to the first node may carry third duration, where the third duration is greater than or equal to minimum configuration switching duration of the second node. When receiving the second client signal flow, the first node may compare the minimum configuration switching duration of the first node with the third duration. If the minimum configuration switching duration of the first node is less than or equal to the third duration, it may be determined that minimum configuration switching duration that needs to be met by both the first node and the second node is the third duration. If the minimum configuration switching duration of the first node is greater than the third duration, it may be determined that minimum configuration switching duration that needs to be met by both the first node and the second node is the minimum configuration switching duration of the first node.

S1302: The first node sends the second client signal flow to the third node, where the second client signal flow carries fourth duration.

It should be understood that if the minimum configuration switching duration of the first node is greater than the third duration, the fourth duration is the minimum configuration switching duration of the first node. If the minimum configuration switching duration of the first node is less than the third duration, the fourth duration is the third duration.

When receiving the second client signal flow, the third node may compare minimum configuration switching duration of the third node with the fourth duration. If the minimum configuration switching duration of the third node is less than or equal to the fourth duration, it may be determined that minimum configuration switching duration that needs to be met by both the first node and the third node is the fourth duration. If the minimum configuration switching duration of the third node is greater than the fourth duration, it may be determined that minimum configuration switching duration that needs to be met by both the first node and the third node is the minimum configuration switching duration of the third node.

It should be noted that, in this embodiment of this application, an example in which the network includes the first node, the second node, and the third node is used, and finally determined minimum configuration switching duration that needs to be met by all the first node to the third node is the first duration. If the network includes more nodes, duration carried in a second client signal flow sent by the previous node to a node is minimum configuration switching duration that needs to be met by a plurality of nodes before the node. The node compares minimum configuration switching duration of the node with duration carried in the received second client signal flow, and by analogy, so that minimum configuration switching duration that needs to be met by all nodes on the network can be determined.

For example, the network includes four nodes, and the four nodes are sequentially a node 1, a node 2, a node 3, and a node 4. Minimum configuration switching duration of the node 1 is 10 ms, minimum configuration switching duration of the node 2 is 20 ms, minimum configuration switching duration of the node 3 is 10 ms, and minimum configuration switching duration of the node 4 is 30 ms. In this case, duration carried in a second client signal flow sent by the node 1 to the node 2 is 10 ms. Because the minimum configuration switching duration of the node 2, that is, 20 ms, is greater than 10 ms, duration carried in a second client signal flow sent by the node 2 to the node 3 is 20 ms. Because the minimum configuration switching duration of the node 3 is equal to 20 ms, duration carried in a second client signal flow sent by the node 3 to the node 4 is 20 ms. Because the minimum configuration switching duration of the node 2, that is, 30 ms, is greater than 20 ms, the node 4 may determine that the first duration is 30 ms.

S1303: The third node sends a third client signal flow to the first node, where the third client signal flow carries the first duration.

S1304: The first node sends the third client signal flow to the second node, where the third client signal flow carries the first duration.

The last node on the network, that is, the third node, may determine, based on the received second client signal flow, that minimum configuration switching duration that needs to be met by all the first node to the third node is the first duration. Then, the third node may feed back the first duration to the second node. For example, the third node may send the third client signal flow to the first node. It should be understood that the third client signal flow carries the first duration, and the first node receives the third client signal flow and forwards the third client signal flow to the second node. In other words, the last node on the network transparently transmits, successively passing through adjacent nodes, the third client signal flow to the first node.

The second node receives the third client signal flow, determines the slot adjustment information based on the first duration carried in the third client signal flow, and then may perform S1001, S1002, S1003, and S1004. The second node determines the first duration in advance, to prevent a bandwidth adjustment failure caused when some nodes each on the network switch slot configuration before completing preparation for switching the slot configuration.

It should be noted that S1301 to S1304 are not indispensable, for example, first duration that can meet minimum configuration switching duration of all nodes on the network and that is obtained based on experience or an implementation experiment. Therefore, S1301 to S1304 are shown by using dashed lines in FIG. 13. In addition, in this embodiment of this application, an example in which the third client signal flow carries the first duration, that is, specific duration is used. In some other embodiments, the third client signal flow may carry information used to indicate the first duration. For example, the third client signal flow may carry a quantity of unit duration. Details are described in subsequent embodiments.

If the second node does not receive the third client signal flow from the first node within first preset duration, it may be considered that transmission of the third client signal flow is interrupted due to a network fault, a node fault, or another possible reason. In this case, the second node may send a first message to a remote device (for example, a network management system), where the first message may be used to notify the remote device that the bandwidth adjustment fails.

Alternatively, if the second node does not receive the third client signal flow from the first node within preset duration, the second node may perform S1301 again. If the second node still does not receive the third client signal flow from the first node, the second node may send a first message to a remote device. It should be noted that a quantity of times of repeatedly performing S1302 by the second node is not limited in this embodiment of this application.

It should be understood that the network preconfigures, for each node on the network, configuration information for receiving or sending a client signal flow by using M slots. For ease of description, the configuration information is referred to as standby slot configuration below. For example, the standby slot configuration is the calendar B. In actual, configuration information included in the calendar B may be an initial default value. For example, the calendar B indicates that numbers of slots that can carry service data are all 0. Therefore, before the slot configuration is switched, it needs to determine whether each node has updated the standby slot configuration, that is, whether each node has updated the standby slot configuration to a to-be-used slot configuration, to avoid a bandwidth adjustment failure caused because one or some nodes on the network have not updated the standby slot configuration. For example, a bandwidth adjustment failure caused because the node has not updated the standby slot configuration because the node is faulty, the node does not support to update the standby slot configuration, or a transmission distance between the node and a network management system is long may be avoided.

Figure 14:
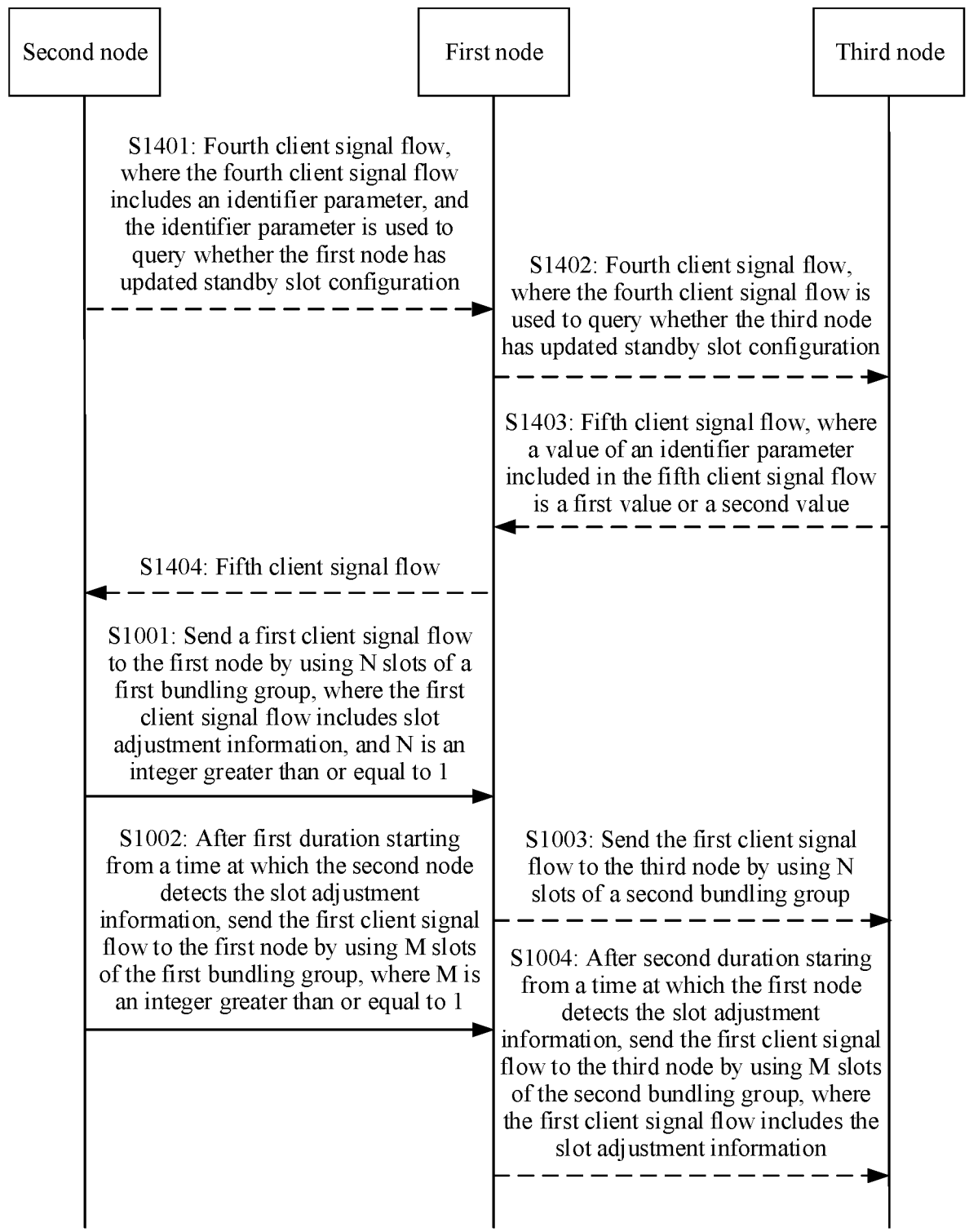
FIG. 14 is a schematic flowchart of an example of a service flow adjustment method according to an embodiment of this application.

For example, FIG. 14 is a flowchart of another example of a service flow adjustment method according to an embodiment of this application.

S1401: The second node sends a fourth client signal flow to the first node, where the fourth client signal flow includes an identifier parameter, and the identifier parameter is used to query whether the first node has updated standby slot configuration.

S1402: The first node sends the fourth client signal flow to the third node, where the fourth client signal flow is used to query whether the third node has updated standby slot configuration.

A value of the identifier parameter may indicate that the node has updated the standby slot configuration or has not updated the standby slot configuration. For example, if the value of the identifier parameter is a first value (for example, 0), it may indicate that the node has updated the standby slot configuration, and if the value of the identifier parameter is a second value (for example, 1), it may indicate that the node has not updated the standby slot configuration.

Assuming that the second node has updated the standby slot configuration, the value of the identifier parameter in the fourth client signal flow sent by the second node to the first node is the first value. The first node receives the fourth client signal flow. If the first node has not updated the standby slot configuration, the first node may change the value of the identifier parameter from the first value to the second value, and then the first node sends the fourth client signal flow to the third node. It should be understood that the value of the identifier parameter in the fourth client signal flow is the second value. If the first node has updated the standby slot configuration, the first node directly sends the fourth client signal flow to the third node. It should be understood that the value of the identifier parameter in the fourth client signal flow is the first value.

It should be noted that, in this embodiment of this application, an example in which the network includes the first node, the second node, and the third node is used. It should be understood that when the network includes more nodes, after a first node that has not updated standby slot configuration receives a fourth client signal flow, the first node updates a value of an identifier parameter included in the fourth client signal flow from a first value to a second value, and sends the fourth client signal flow to a next node. Then, the next node and each subsequent node forward the received fourth client signal flow until the fourth client signal flow is sent to the last node.

For example, the network includes four nodes, and the four nodes are sequentially a node 1, a node 2, a node 3, and a node 4. It is assumed that the node 1 has updated standby slot configuration, the node 2 has updated standby slot configuration, the node 3 has not updated standby slot configuration, and the node 4 has updated standby slot configuration. In this case, a value of an identifier parameter included in a fourth client signal flow sent by the node 1 to the node 2 is a first value, a value of an identifier parameter included in the fourth client signal flow sent by the node 2 to the node 3 is the first value, a value of an identifier parameter included in the fourth client signal flow sent by the node 3 to the node 4 is a second value, and the node 4 may determine that a value of an identifier parameter included in the to-be-sent fourth client signal is the second value.

Alternatively, it is assumed that the node 1 has updated standby slot configuration, the node 2 has not updated standby slot configuration, the node 3 has updated standby slot configuration, and the node 4 has updated standby slot configuration. In this case, a value of an identifier parameter included in a fourth client signal flow sent by the node 1 to the node 2 is a first value, a value of an identifier parameter included in the fourth client signal flow sent by the node 2 to the node 3 is a second value, a value of an identifier parameter included in the fourth client signal flow sent by the node 3 to the node 4 is the second value, and the node 4 may determine that a value of an identifier parameter included in the to-be-sent fourth client signal is the second value.

S1403: The third node sends a fifth client signal flow to the first node, where a value of an identifier parameter included in the fifth client signal flow is the first value or the second value.

S1404: The first node sends the fifth client signal flow to the second node.

The last node on the network may determine whether there is a node, on the network, that has not updated standby slot configuration, and feed back, to the first node, whether there is the node, on the network, that has not updated the standby slot configuration. For example, if there is a node, on the network, that has not updated standby slot configuration, the third node may send the fifth client signal flow to the first node. It should be understood that a value of an identifier parameter included in the fifth client signal is a second value, and the first node receives the fifth client signal flow, and forwards the fifth client signal flow to the second node. In other words, the last node on the network transparently transmits, successively passing through adjacent nodes, the fifth client signal flow to the first node. If there is no node, on the network, that has not updated standby slot configuration, the last node on the network transparently transmits, successively passing through adjacent nodes, the fifth client flow signal to the first node, where the value of the identifier parameter included in the fifth client signal is the first value.

The second node receives the fifth client signal flow, and may determine, based on the value of the identifier parameter included in the fifth client signal flow, whether to send the first client signal flow to the first node. That is, S1001, S1002, S1003, and S1004 may be performed. If the value of the identifier parameter included in the fifth client signal flow is the first value, the second node may send the first client signal flow to the first node, to implement bandwidth adjustment. If the value of the identifier parameter included in the fifth client signal flow is the second value, the second node may not send the first client signal flow to the first node. In this way, a bandwidth adjustment failure caused by slot configuration switching performed by some nodes on the network before updating standby slot configuration can be prevented.

Certainly, S1401 to S1404 are not indispensable. Therefore, S1401 to S1404 are illustrated by dashed lines in FIG. 14. In some embodiments, this embodiment of this application may include S1301 to S1304, S1401 to S1404, and S1001 to S1004. It should be noted that a sequence of performing S1301 and S1401 is not limited in this embodiment of this application.

If the second node does not receive the fifth client signal flow from the first node within second preset duration, it may be considered that transmission of the fifth client signal flow is interrupted due to a node fault, a network fault, or another possible reason. In this case, the second node may send a second message to a remote device (for example, a network management system), where the second message may be used to notify the remote device that the bandwidth adjustment fails.

Alternatively, if the second node does not receive the fifth client signal flow from the first node within preset duration, the second node may perform S1401 again. If the second node still does not receive the fifth client signal flow from the first node, the second node may send a second message to a remote device. It should be noted that a quantity of times of repeatedly performing S1401 by the second node is not limited in this embodiment of this application.

The client signal flow defined in this embodiment of this application is actually a code block stream, that is, a data stream in a unit of a code block. For example, the second node sends the first client signal flow to the first node, that is, the second node sends a code block stream to the first node through a transmit port of the second node. The code block stream carries service data and slot adjustment information. Certainly, the code block stream may further carry information other than the service data, for example, coding information and control information. For another example, the second node sends the second client signal flow to the first node, that is, the second node sends a code block stream to the first node through a transmit port of the second node, and the code block stream carries at least information indicating minimum configuration switching duration, for example, the third duration. For still another example, the second node sends the fourth client signal flow to the first node, that is, the second node sends a code block stream to the first node through a transmit port of the second node, and the code block stream carries at least an identifier parameter or a value of the identifier parameter. Because the second client signal flow is used to query the minimum configuration switching duration of the node, the duration carried by the second client signal flow may be considered as query information. For ease of description, the following uses an example in which the second client signal flow includes the query information and the query information is used to query the minimum configuration switching duration of the node for description.

The foregoing describes how to implement the bandwidth adjustment by sending the client signal flow, how to determine, before the bandwidth adjustment, the minimum configuration switching duration, that is, the first duration, that needs to be met by each node on the network, and how to determine whether each node has updated the standby slot configuration. The following separately describes specific implementation solutions of the query information, the identifier parameter, and the slot configuration information.

The query information, the identifier parameter, and the slot configuration information may all be carried in a data block, in the client signal flow, other than a data block that carries the service data, for example, may be carried in a first code block in the client signal flow. The first code block may be a control code block. In this embodiment of this application, a new control code block may be defined, and a function of the control code block is distinguished by defining a type of the control code block. For example, if the type of the control code block is a type 1, the control code block is used to carry query information. If the type of the control code block is a type 2, the control code block is used to carry an identifier parameter. If the type of the control code block is a type 3, the control code block is used to carry slot adjustment information. That is, a client signal flow sent by a send includes a control block, and a receive side receives the client signal flow, and may determine, based on the type of the control block, that which type of information is carried on the control block.

For example, the first code block is an ordered set code block (which may also be written as an O code block). In other words, in this embodiment of this application, the O code block may be used to carry the query information, the identification parameter, or the slot configuration information. The O code block may replace an idle code block, that is, a resource occupied by the idle code block is occupied by the O code block, and is sent together with the service flow.

For example, FIG. 15 is a schematic diagram of a structure of the O code block. A coding format of the O code block is 64B/66B. 0x4B, 0xC, and CRC4 fields of the O code block are fixed parts. A type field of the O code block distinguishes between O code block types (which may also be understood as functions) by carrying different values. A value field of the O code block may carry, for example, the first duration carried in the slot adjustment information, or may carry, for example, the third duration indicated by the query information, or may carry a value of the identifier parameter. It should be understood that different value fields carry different information. For example, a value 1 field may carry the first duration carried in the slot adjustment information, a value 2 field may carry the third duration indicated by the query information, and a value 3 field may carry the value of the identifier parameter. Different bits of a same value field may also carry different information. For example, some bits included in the value 1 field may carry the first duration carried in the slot adjustment information, and some other bits included in the value 1 field may carry the third duration indicated by the query information.

For ease of description, in the following description, if a value of the type field is a first value, it indicates that the type of the O code block is a first type and is used for bandwidth adjustment; if the value of the type field is a second value, it indicates that the type of the 0 code block is a second type and is used to query the minimum configuration switching duration of the node; and if the value of the type field is a third value, it indicates that the type of the 0 code block is a third type and is used to query whether the node has updated the standby slot configuration. In addition, an example in which the value 1 field carries the slot adjustment information, the value 2 field carries the query information, and the value 3 field carries the identifier parameter is used.

In some embodiments, if the value of the type field of the O code block is the first value, the value 1 field of the O code block may carry the first duration, or may not carry the first duration. In other words, the slot adjustment information may be carried in the type field of the O code block. In this case, it may be considered that the type field may indicate both the type of the O code block and the first duration. For example, the value of the type field of the O code block is the first value. If a value of the value 1 field of the O code block is 0, it may be considered that the value 1 field does not carry the first duration. In this case, it may be considered that the slot adjustment information does not carry the first duration, and the first duration may be agreed on in a protocol, or may be preset. If the value of the type field of the O code block is the first value. If the value of the value 1 field of the O code block is not 0, it may be considered that the value 1 field carries the first duration. In this case, it may be considered that the slot adjustment information does not carry the first duration, and the first duration may be agreed on in a protocol, or may be preset.

In a possible implementation, the first duration may be specific duration, for example, 10 ms or 20 ms.

In another possible implementation, the first duration may also be indicated by using a quantity of unit duration. For example, the slot adjustment information may include a first coefficient, and the first duration is unit duration of the first coefficient. For example, duration required for transmitting 20 code blocks on a FlexE port is 12.6 ns, and 12.6 ns may be defined as unit duration. In this case, the value 1 field may carry a quantity of unit duration. For example, if the value of the value 1 field is 10, the first duration is 126 ns.

Similarly, if the value of the type field of the O code block is the second value, the value 2 field of the O code block may carry the query information. In other words, for example, the third duration indicated by the query information may be carried in the value 2 field of the O code block, and a value of the value 2 field indicates minimum configuration switching duration that needs to be met by one or more nodes. Similar to the first duration, the value of the value 2 field may be specific duration, or may be a quantity of unit duration. For details, refer to the foregoing implementation in which the value 1 field carries the first duration. Details are not described herein again.

Similarly, if the value of the type field of the O code block is a third value, the value 3 field of the O code block may carry the identifier parameter. In other words, if a value of the value 3 field is a first value, the O code block indicates that the node has updated the standby slot configuration. If a value of the value 3 field is a second value, the O code block indicates that the node has not updated the standby slot configuration.

In this embodiment of this application, based on the solution shown in FIG. 10, FIG. 13, or FIG. 14, times at which all nodes on the network switch slot configuration may be unified. To restore data sent by the transmit end, the receive end needs to accurately know time points at which all the nodes switch the slot configuration. Therefore, in this embodiment of this application, a starting point for timing by each node may be specified, that is, it is specified that the node switches slot configuration after the first duration starting from a moment. For example, in this embodiment of this application, it may be specified that a next node starts timing after first duration starting from a time at which the next node receives slot adjustment information, the next node switches from the calendar A to the calendar B.

For example, the slot adjustment information sent by the second node includes a first coefficient, that is, a quantity of unit duration. It is assumed that the first coefficient is 5, and the unit duration is duration for transmitting 20 code blocks. In this case, after the first node receives the first code block in the first client signal flow and after 5×20 code blocks, the first node switches from the calendar A to the calendar B.

For another example, the slot adjustment information includes the first duration. It is assumed that the first duration is 10 ms. The second node sends the first client signal flow to the first node. The second node may start timing for 10 ms from a starting point at which the O code block is inserted in the first client signal flow, and then switch from the calendar A to the calendar B. For the first node, the first node may start timing for 10 ms from a starting point at which the first node detects the O code block included in the first client signal flow, and then switch from the calendar A to the calendar B.

For the receive end, in a process of restoring the client signal sent by the transmit end, which slots belong to the client signal flow may be determined based on the detected 0 code block, the detected slot adjustment information, and the detected currently used slot configuration that are in the received code block stream, to restore the client signal sent by the transmit end. There may be one or more first code blocks sent together with the client signal code block. A larger quantity of first code blocks indicates more accurate recovery of the client signal sent by the transmit end.

For example, the second node sends a plurality of code blocks by using the N slots of the first bundling group, where the slot adjustment information may be carried on at least one of the plurality of code blocks. Correspondingly, the first node receives the plurality of code blocks by using the N slots of the first bundling group, and the at least one of the plurality of code blocks carries the slot adjustment information.

For example, the second node sends N code blocks in one sending period by using the N slots of the first bundling group, and the first node receives the N code blocks in one receiving period by using the N slots of the first bundling group. The slot adjustment information may be carried on at least one of the N code blocks. For example, the N slots are a slot 0 and a slot 19, and the M slots are a slot 0, a slot 1, and a slot 19. When sending the first client signal flow, the transmit end may insert one O code block into the first client signal flow. The inserted O code block may be located in the slot 0 or the slot 19. The receive end may receive the inserted O code block in the slot 0 or the slot 19. Alternatively, when sending the first client signal flow, the transmit end may insert a plurality of O code blocks into the first client signal flow. The plurality of O code blocks may be located in the slot 0 and/or the slot 19. This can avoid a case in which a bandwidth of a transmission channel cannot be adjusted based on slot adjustment information because a code block carrying slot adjustment information is lost. It should be noted that the sending period and the receiving period herein are respectively duration required for sending and duration required for receiving code blocks of a quantity of slots divided from a PHY. For example, for a 100G PHY interface that is divided into 20 slots, one sending period is duration required for sending 20 code blocks, and one receiving period is a duration required for receiving 20 code blocks. It should be understood that the 20 code blocks are distributed in the 20 slots obtained through division, and the 20 code blocks are separately distributed in different slots. The second node allocates, to a corresponding slot according to a preset slot configuration table, a code block that belongs to the client signal flow, and then sends the code block stream in a polling manner in one or more sending periods, where the code block stream includes a client signal. Correspondingly, the first node receives the code block stream in a polling manner in one or more receiving periods, and extracts, according to the preset slot configuration table, the code block, in the code block stream, that belongs to the client signal flow from the corresponding slot.

For still another example, the second node sends S×N code blocks in S consecutive sending periods by using the N slots of the first bundling group, and the first node receives the S×N code blocks in S consecutive receiving periods by using the N slots of the first bundling group. The slot adjustment information may be carried on at least one of the S×N code blocks, and S is greater than or equal to 2. For example, for the S consecutive receiving periods, the slot adjustment information may be carried in S code blocks in the S×N code blocks, and one receiving period corresponds to one code block. This can avoid a case in which the receive end cannot accurately restore the client signal sent by the transmit end because a code block carrying slot adjustment information is lost, and more idle resources are reserved as many as possible.

The first node receives the first client flow signal sent by the second node, and may switch the slot configuration based on the slot adjustment information carried in the first client signal flow.

In some embodiments, after receiving the first client flow signal sent by the second node, the first node may first forward the first client signal flow to the third node, and after the first duration, switch the slot configuration, as described in S1003 and S1004. Because the first node needs specific duration (the minimum configuration switching duration) to switch the slot configuration, after receiving the first client flow signal, the first node may forward the first client flow signal to the third node, and after the first duration, switch the slot configuration, that is, bandwidth adjustment of the transmission channel is coupled to bandwidth adjustment of the client signal, which is simple.

In some other embodiments, after receiving the first client signal flow sent by the second node and after the first duration, the first node may first switch the slot configuration, and then forward the first client signal flow to the third node. That is, in an alternative implementation of S1003 and S1004, before the first duration, the first node sends, to the third node by using N slots of a second bundling group, a first client signal flow after the slot adjustment information is deleted. That is, before the first duration, the first node extracts the slot adjustment information from the received first client signal flow, and then sends the first client signal flow to the third node by using the N slots of the second bundling group. That is, the first client signal flow sent by the first node to the third node does not include the slot adjustment information. After the first duration, the first node sends the first client signal flow to the third node by using M slots of the second bundling group, where the first client signal flow includes the slot adjustment information.

In comparison, in the foregoing two manners, in the first manner, the first node first forwards the received first client signal flow, and then switches the slot configuration; and in the second manner, the first node first switches the slot configuration, and then forwards the first client signal flow. Both manners are related to transmission of the first client signal flow. The first manner is transparent transmission, and the second manner is non-transparent transmission. For ease of description, the first manner is referred to as a transparent transmission mode, and the second manner is referred to as a non-transparent transmission mode in the following.

It should be noted that herein, first forwarding the first client signal flow and then switching the slot configuration, or first switching the slot configuration and then forwarding the first client signal flow does not refer to an absolute time sequence, but is only for ease of distinguishing between the transparent transmission mode and the non-transparent transmission mode.

Because it takes the node some time to switch the slot configuration, in the non-transparent transmission mode, the bandwidth adjustment of the transmission channel and the bandwidth adjustment of the client signal are decoupled from each other.

For example, if M is greater than N, that is, the bandwidth of the transmission channel needs to be increased, the bandwidth of the transmission channel may be increased first, and then the bandwidth of the client signal is increased. Specifically, in a process in which the first node sends the first client signal flow to the third node by using the N slots of the second bundling group, the first node may fill, with an idle code block, a slot not carrying the first client signal flow in the M slots. For example, the N slots are a slot 0 and a slot 1, and the M slots are a slot 0, a slot 1, and a slot 19. In other words, the bandwidth of the transmission channel needs to be increased. In this case, the slot 19 in the M slots may be filled with an idle code block, that is, a bandwidth of a transmission channel between the first node and the third node is increased. Then, service data included in the first client signal flow may replace the idle code block carried in the slot 19, so that the first client signal flow can be transmitted on an increased transmission channel.

Accordingly, M is less than N, that is, the bandwidth of the transmission channel needs to be reduced. The bandwidth of the client signal may be reduced first, and then the bandwidth of the transmission channel is reduced. For example, assuming that N is equal to 3 and M is equal to 2, the client signal needs to be switched from occupying three slots to occupying two slots. In this case, because the bandwidth of the transmission channel is not adjusted, that is, the bandwidth of the transmission channel is still three slots, in a process in which the first node sends the first client signal flow to the third node, at least one of the N slots may be filled with an idle code block. Then, in a process in which the first node switches the bandwidth of the transmission channel, the idle code block carried in the at least one slot may be deleted. For example, the N slots are a slot 0, a slot 1, and a slot 19, and the M slots are a slot 0 and a slot 1. In a process in which the first node sends the first client signal flow to the third node, the slot 19 may be filled with an idle code block. In a process in which the first node switches the bandwidth of the transmission channel to the slot 0 and the slot 1, the idle code block carried in the slot 19 is deleted. Then, service data included in the first client signal flow may be carried in the slot 0 and the slot 1, so that a decreased first client signal flow is transmitted on a decreased transmission channel. This prevents service damage caused by decreasing of the bandwidth of the transmission channel before decreasing of the bandwidth of the client signal.

It should be understood that the first client signal flow may include an idle code block, but the idle code block is random. The idle code block filled in the at least one of the N slots is periodic. In other words, the at least one of the N slots filled with the idle code block is periodic.

It should be understood that the second node has a transmit port, and may switch the slot configuration at the transmit port; the first node has a transmit port and a receive port, and may switch the slot configuration at the transmit port and the receive port; and the third node has a receive port, and may switch the slot configuration at the receive port. For the second node and the third node, the slot configuration is switched at a single-side port. In this case, a time for the second node or the third node to switch the slot configuration is a time after a plurality of unit duration (that is, a plurality of code blocks) or after the first duration starting from a moment at which the second node or the third node detects the O code block. For the first node, the slot configuration needs to be switched at both the transmit port and the receive port, and the first node has a cross-connect function, that is, a to-be-received signal is restored at the receive port from a signal sent from the transmit end, and then the signal is sent to the third node through the transmit port. Therefore, the starting point at which the first node determines to switch the slot configuration may be the same as or different from the starting point at which the second node or the third node switches the slot configuration, provided that the receive end is not affected to restore the service flow sent by the transmit end.

According to the solution provided in this embodiment of this application, times at which all nodes on the network switch the slot configuration can be unified, and service damage that may be caused in a process of adjusting the bandwidth of the transmission channel can be resolved. On the network supporting at least two nodes, because the slot adjustment information is sent together with the client signal, a time for negotiating, by two nodes, for switching the slot configuration through message exchange, and a delay is reduced. In addition, there is no need to set the buffer on the transmit end or the receive end to avoid service damage, thereby reducing the buffer requirement on the node.

Figure 16:
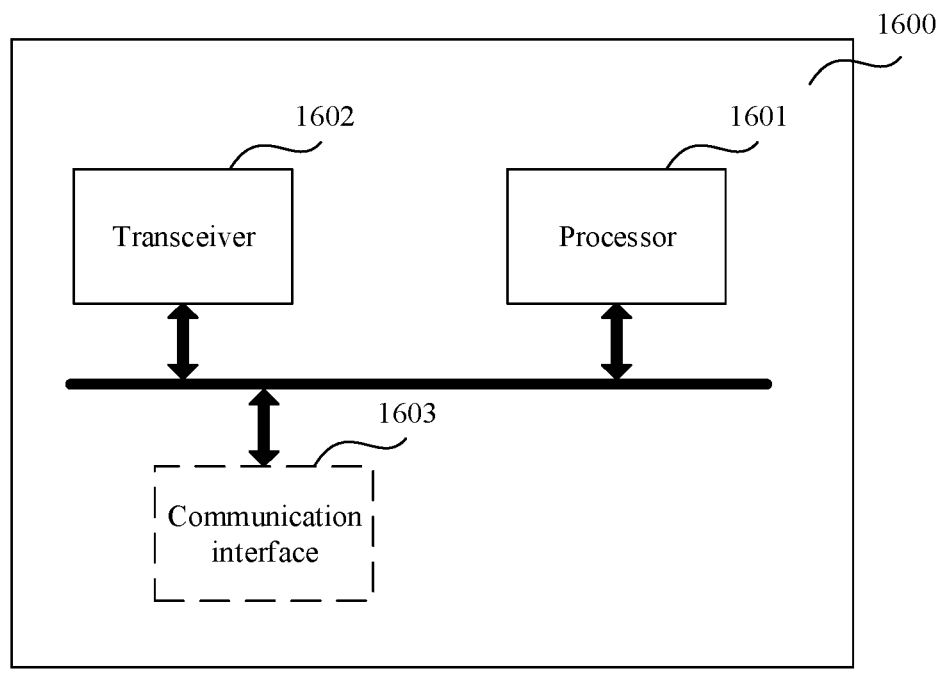
FIG. 16 is a schematic diagram of a structure of a communication apparatus according to an embodiment of this application.

Based on the foregoing content and a same concept, FIG. 16 is a schematic diagram of a structure of a communication apparatus 1600. The communication apparatus 1600 may correspondingly implement functions or steps implemented by the first node or the second node in the foregoing method embodiments. The communication apparatus may be a network device (for example, a switch), or may be a chip or a circuit, for example, a chip or a circuit that may be disposed in a network device. The communication apparatus 1600 may include a processor 1601 and a transceiver 1602. The processor 1601 and the transceiver 1602 may be connected by using a bus system. Optionally, the communication apparatus may further include a memory. The storage unit may be configured to store instructions (code or a program) and/or data. The transceiver 1602 and the processor 1601 may be coupled to the storage unit. For example, the processor 1601 may read the instructions (the code or the program) and/or the data in the storage unit, to implement a corresponding method. The foregoing units may be independently disposed, or may be partially or completely integrated. For example, the transceiver 1602 may include a transmitter and a receiver that are independently disposed. Optionally, the communication apparatus 1600 may further include a communication interface 1603. The communication interface 1603 is configured to input and/or output information. The processor 1601 is configured to execute a computer program or instructions, so that the communication apparatus 1600 implements the method on the first node side or the second node side in the related solution in FIG. 10, FIG. 13, or FIG. 14. Because the communication interface 1603 is optional, a dashed line is used for illustration in FIG. 16.

It should be understood that the processor 1601 may be a chip. For example, the processor may be a field programmable gate array (FPGA), an application-specific integrated circuit (ASIC), a system-on-a-chip (SoC), a central processing unit (CPU), a network processor (NP), a digital signal processing circuit (digital signal processor, DSP), a micro controller unit (MCU), a programmable logic device (PLD), or another integrated chip.

In an implementation process, steps in the foregoing methods can be implemented by using a hardware integrated logical circuit in the processor, or by using instructions in a form of software. The steps of the method disclosed with reference to embodiments of this application may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It should be noted that, the processor 1601 in embodiments of this application may be an integrated circuit chip, and has a signal processing capability. In an implementation process, steps in the foregoing method embodiments can be implemented by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. It may implement or perform the methods, the steps, and logical block diagrams that are disclosed in embodiments of this application. The general-purpose processor may be a microprocessor, or the processor may be any conventional processor or the like. The steps of the method disclosed with reference to embodiments of this application may be directly performed by a hardware decoding processor, or may be performed by using a combination of hardware in the hardware decoding processor and a software module. A software module may be located in a mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory in this embodiment of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM). It should be noted that the memory of the systems and methods described in this specification includes but is not limited to these and any memory of another proper type.

In some embodiments, the communication apparatus 1600 can correspondingly implement the behavior and functions of the first node in the foregoing method embodiments. For example, the communication apparatus 1600 may be the first node, or may be a component (for example, a chip or a circuit) used in the first node. The communication apparatus 1600 may include a processor 1601 and a transceiver 1602. The transceiver 1602 may be configured to perform all receiving or sending operations performed by the first node in the embodiment shown in FIG. 10, FIG. 13, or FIG. 14, for example, S1001, S1002, and S1003 in the embodiment shown in FIG. 10, and/or another process used to support the technology described in this specification; for another example, S1301, S1302, S1303, and S1304 in the embodiment shown in FIGS. 13 and S1001, S1002, and S1003, and/or other processes used to support the technology described in this specification; for still another example, S1401, S1402, S1403, and S1404 in the embodiment shown in FIGS. 14 and S1001, S1002, and S1003, and/or other processes used to support the technology described in this specification. The processor 1601 is configured to perform an operation other than all receiving or sending operations performed by the first node in the embodiment shown in FIG. 10, FIG. 13, or FIG. 14.

For example, the transceiver 1602 is configured to receive a first client signal flow from a second node by using N slots of a first bundling group, and the processor 1601 is configured to: after first duration starting from a time at which the processor 1601 detects slot configuration information, control the transceiver 1602 to receive the first client signal flow from the second node by using M slots of the first bundling group, where the first client signal flow includes slot adjustment information, the first bundling group includes P physical layer PHY links, a bandwidth resource of each PHY link is divided into Q slots, bandwidth resources of the first bundling group are divided into P×Q slots, N, P, and Q are all integers greater than or equal to 1, and M is an integer greater than or equal to 1.

In an optional implementation, the transceiver 1602 is specifically configured to receive a plurality of code blocks by using the N slots of the first bundling group, where the slot adjustment information is carried on at least one of the plurality of code blocks.

For example, the transceiver 1602 is configured to receive N code blocks in one receiving period by using the N slots of the first bundling group, where the slot adjustment information is carried on at least one of the N code blocks.

For example, the transceiver 1602 is configured to receive S×N code blocks in S consecutive receiving periods by using the N slots of the first bundling group, where the slot adjustment information is carried on at least one of the S×N code blocks, and S is greater than or equal to 2.

In an optional implementation, M is greater than N.

In an optional implementation, M is less than N.

In an optional implementation, M is equal to N, and a location of at least one of the M slots is different from a location of at least one of the N slots.

In an optional implementation, the transceiver 1602 is further configured to: before the first duration, send the first client signal flow to a third node by using N slots of a second bundling group, where the first client signal flow includes the slot adjustment information. Then, the processor 1601 is further configured to: after second duration starting from a time at which the processor 1601 detects slot configuration information, control the transceiver 1602 to send the first client signal flow to the third node by using M slots of the second bundling group.

In an optional implementation, the transceiver 1602 is further configured to: before the first duration, send, to a third node by using N slots of a second bundling group, a first client signal flow obtained after the slot adjustment information is deleted; and after the first duration, send the first client signal flow to the third node by using M slots of the second bundling group, where the first client signal includes the slot adjustment information.

In an optional implementation, when M is greater than N, and in a process in which the transceiver 1602 sends the first client signal flow to the third node by using the N slots of the second bundling group, the processor 1601 is configured to fill, with an idle code block, a slot not carrying the first client signal flow in the M slots.

In an optional implementation, when M is less than N, at least one of the N slots received by the transceiver 1602 is filled with an idle code block.

In an optional implementation, the slot adjustment information carries the first duration.

In an optional implementation, the slot adjustment information is carried in a type field of a first code block in the first client signal flow, the type field indicates a type of the first code block and the first duration, and different values of the type field correspond to different first duration; or the slot adjustment information is carried in a type field and a value field of a first code block in the first client signal flow, the type field indicates a type of the first code block, and the value field indicates the first duration.

In an optional implementation, the slot adjustment information includes the first duration; or the slot adjustment information includes a first coefficient, and the first duration is unit duration of the first coefficient.

In an optional implementation, before that the transceiver 1602 receives a first client signal flow from a second node by using N slots of a first bundling group, the transceiver 1602 is further configured to:

receive a second client signal flow from the second node, where the second client signal flow carries third duration, and the third duration is used to query shortest duration required by the first node to switch from receiving the first client signal flow by using the N slots to receiving the first client signal flow by using the M slots, and/or shortest duration required by the first node to switch from sending the first client signal flow by using the N slots to sending the first client signal flow by using the M slots; and send the second client signal flow to the third node, where the second client signal flow carries fourth duration, when the shortest duration is less than or equal to the third duration, the fourth duration is equal to the third duration, and when the shortest duration is greater than the third duration, the fourth duration is the shortest duration.

In an optional implementation, the transceiver 1602 is configured to: receive a third client signal flow from the third node, where the third client signal flow carries the first duration; and send the third client signal flow to the second node.

In an optional implementation, before that the transceiver 1602 receives a first client signal flow from a second node by using N slots of a first bundling group, the transceiver 1602 is further configured to:

receive a fourth client signal flow from the second node, where the fourth client signal flow includes an identifier parameter, and the identifier parameter is used to query whether the first node has updated configuration information about receiving the first client signal flow by using the M slots, if a value of the identifier parameter is a first value, it indicates that the configuration information has been updated, and if a value of the identifier parameter is a second value, it indicates that the configuration information has not been updated; and send the fourth client signal flow to the third node, where when the first node has not updated the configuration information, the value of the identifier parameter is the second value.

In an optional implementation, the transceiver 1602 is further configured to:

receive a fifth client signal flow from the third node, where a value of an identifier parameter included in the fifth client signal flow is the first value or the second value; and send the fifth client signal flow to the second node.

In some other embodiments, the communication apparatus 1600 can correspondingly implement the behavior and functions of the second node in the foregoing method embodiments. For example, the communication apparatus 1600 may be the second node, or may be a component (for example, a chip or a circuit) used in the second node. The communication apparatus 1600 may include a processor 1601 and a transceiver 1602. The transceiver 1602 may be configured to perform all receiving or sending operations performed by the second node in the embodiment shown in FIG. 10, FIG. 13, or FIG. 14, for example, S1001 and S1002 in the embodiment shown in FIG. 10, and/or another process used to support the technology described in this specification; for another example, S1301 and S1304 in the embodiment shown in FIGS. 13 and S1001 and S1002, and/or other processes used to support the technology described in this specification; for still another example, S1401 and S1404 in the embodiment shown in FIGS. 14 and S1001 and S1002, and/or other processes used to support the technology described in this specification. The processor 1601 is configured to perform an operation other than all receiving or sending operations performed by the second node in the embodiment shown in FIG. 10, FIG. 13, or FIG. 14.

For example, the transceiver 1602 is configured to send a first client signal flow to a first node by using N slots of a first bundling group, the processor 1601 is configured to:

after first duration starting from a time at which the processor 1601 detects slot adjustment information, control the transceiver 1602 to send the first client signal flow to the first node by using M slots of the first bundling group, where the first client signal flow includes the slot adjustment information, the first bundling group includes P physical layer PHY links, a bandwidth resource of each PHY link is divided into Q slots, bandwidth resources of the first bundling group are divided into P×Q slots, N, P, and Q are all integers greater than or equal to 1, and M is an integer greater than or equal to 1.

In an optional implementation, the transceiver 1602 is specifically configured to send a plurality of code blocks by using the N slots of the first bundling group, where the slot adjustment information is carried on at least one of the plurality of code blocks.

For example, the transceiver 1602 is specifically configured to send N code blocks to the first node in one sending period by using the N slots of the first bundling group, where the slot adjustment information is carried on at least one of the N code blocks.

For example, the transceiver 1602 is specifically configured to send S×N code blocks to the first node in S consecutive sending periods by using the N slots of the first bundling group, where the slot adjustment information is carried on at least one of the S×N code blocks, and S is greater than or equal to 2.

In an optional implementation, M is greater than N.

In an optional implementation, M is less than N.

In an optional implementation, M is equal to N, and a location of at least one of the M slots is different from a location of at least one of the N slots.

In an optional implementation, the transceiver 1602 is further configured to: before the first duration, receive a first client signal flow from a third node by using N slots of a second bundling group, where the first client signal flow includes the slot adjustment information. Then, the processor 1601 is further configured to: after second duration starting from a time at which the processor 1601 detects slot configuration information, control the transceiver 1602 to receive the first client signal flow from the third node by using M slots of the second bundling group, and the first client signal flow includes the slot adjustment information.

In an optional implementation, the transceiver 1602 is configured to: before the first duration, send a first client signal flow obtained after the slot adjustment information is deleted; and after the first duration, send the first client signal flow to the first node by using M slots of the first bundling group, where the first client signal flow includes the slot adjustment information.

In an optional implementation, when M is greater than N, and in a process in which the transceiver 1602 sends the first client signal flow to the first node by using the N slots of the first bundling group, the processor 1601 is configured to fill, with an idle code block, a slot not carrying the first client signal flow in the M slots.

In an optional implementation, the slot adjustment information carries the first duration.

In an optional implementation, the slot adjustment information is carried in a type field of a first code block in the first client signal flow, the type field indicates a type of the first code block and the first duration, and different values of the type field correspond to different first duration; or the slot adjustment information is carried in a type field and a value field of a first code block in the first client signal flow, the type field indicates a type of the first code block, and the value field indicates the first duration.

In an optional implementation, the slot adjustment information includes the first duration; or the slot adjustment information includes a first coefficient, and the first duration is unit duration of the first coefficient.

In an optional implementation, the transceiver 1602 is further configured to: send a second client signal flow to the first node, where the second client signal flow carries third duration, and the second client signal flow is used to query shortest duration required by the first node to switch from receiving the first client signal flow by using the N slots to receiving the first client signal flow by using the M slots.

In an optional implementation, the transceiver 1602 is further configured to receive a third client signal flow from the first node, where the third client signal flow carries the first duration.

In an optional implementation, the transceiver 1602 is further configured to:

send a fourth client signal flow to the first node, where the fourth client signal flow includes an identifier parameter, and the identifier parameter is used to query whether the first node has updated configuration information about receiving the first client signal flow by using the M slots, if a value of the identifier parameter is a first value, it indicates that the configuration information has been updated, and if a value of the identifier parameter is a second value, it indicates that the configuration information has not been updated.

In an optional implementation, the transceiver 1602 is further configured to receive a fifth client signal flow from the first node, where a value of an identifier parameter included in the fifth client signal flow is the first value or the second value.

In an optional implementation, the transceiver 1602 is further configured to: if the transceiver 1602 does not receive the third client signal flow from the first node within first preset duration, send a first message to a remote device, where the first message is used to notify the remote device that the bandwidth adjustment fails.

In an optional implementation, the transceiver 1602 is further configured to: if the transceiver 1602 does not receive the fifth client signal flow from the first node within second preset duration, send a second message to a remote device, where the second message is used to notify the remote device that the bandwidth adjustment fails.

For concepts, explanations, detailed descriptions, and other steps of the communication apparatus 1600 that are related to the technical solutions provided in this embodiment of this application, refer to the descriptions of the content in the foregoing method embodiments or other embodiments. Details are not described herein again.

Figure 17:
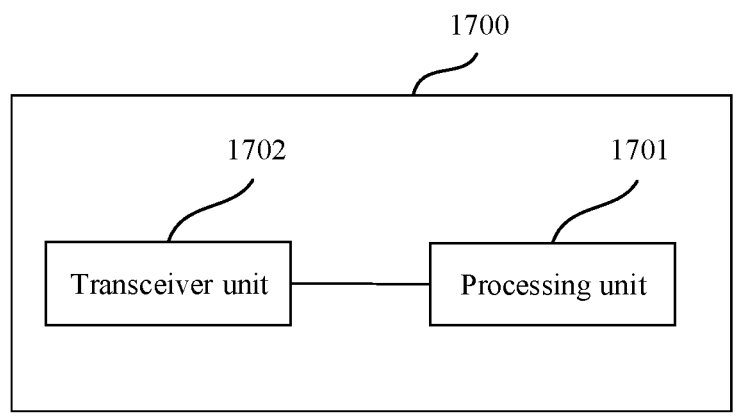
FIG. 17 is a schematic diagram of a structure of a communication apparatus according to an embodiment of this application.

FIG. 17 is another schematic diagram of a structure of a communication apparatus 1700 according to an embodiment of this application. As shown in FIG. 17, the communication apparatus 1700 may include a processing unit 1701 and a transceiver unit 1702. It should be understood that unit division of the communication apparatus 1700 is merely logical function division. During actual implementation, all or some of the units may be integrated into one physical entity, or may be physically separated. In this embodiment of this application, the transceiver unit 1702 may be implemented by the transceiver 1602 in FIG. 16, and the processing unit 1701 may be implemented by the processor 1601 in FIG. 16.

The communication apparatus 1700 can correspondingly implement the steps performed on the first node side and/or the second node side in the foregoing method embodiments. For example, the communication apparatus 1700 may be the first node, or may be a component (for example, a chip or a circuit) used in the first node. In a possible implementation, the transceiver unit 1702 is configured to receive a first client signal flow from a second node by using N slots of a first bundling group, and the processing unit 1701 is configured to: after first duration starting from a time at which the processing unit 1701 detects slot adjustment information, control the transceiver unit 1702 to receive the first client signal flow from the second node by using M slots of the first bundling group, where the first client signal flow includes the slot adjustment information, the first bundling group includes P PHY links, a bandwidth resource of each PHY link is divided into Q slots, bandwidth resources of the first bundling group are divided into P×Q slots, N, P, and Q are all integers greater than or equal to 1, and M is an integer greater than or equal to 1.

For concepts, explanations, detailed descriptions, and other steps of the communication apparatus 1700 that are related to the technical solutions provided in this embodiment of this application, refer to the descriptions of the content in the foregoing method embodiments or other embodiments. Details are not described herein again. It may be understood that for functions of the units in the communication apparatus 1700, refer to implementation of a corresponding method embodiment. Details are not described herein again.

For another example, the communication apparatus 1700 can correspondingly implement the behavior and functions of the second node in the foregoing method embodiments. For example, the communication apparatus 1700 may be the second node, or may be a component (for example, a chip or a circuit) used in the second node. In a possible implementation, the transceiver unit 1702 is configured to send a first client signal flow to a first node by using N slots of a first bundling group. The processing unit 1701 is configured to: after first duration starting from a time at which the processing unit 1701 detects the slot adjustment information, control the transceiver unit 1702 to send the first client signal flow to the first node by using M slots of the first bundling group, where the first client signal flow includes the slot adjustment information, the first bundling group includes P physical layer PHY links, a bandwidth resource of each PHY link is divided into Q slots, bandwidth resources of the first bundling group are divided into P×Q slots, N, P, and Q are all integers greater than or equal to 1, and M is an integer greater than or equal to 1.

For concepts, explanations, detailed descriptions, and other steps of the communication apparatus 1700 that are related to the technical solutions provided in this embodiment of this application, refer to the descriptions of the content in the foregoing method embodiments or other embodiments. Details are not described herein again. It may be understood that for functions of the units in the communication apparatus 1700, refer to implementation of a corresponding method embodiment. Details are not described herein again.

It should be understood that division into units of the communication apparatus 1700 is merely logical function division. During actual implementation, all or some of the units may be integrated into one physical entity, or may be physically separated. In this embodiment of this application, the transceiver unit 1702 may be implemented by the transceiver 1602 in FIG. 16, and the processing unit 1701 may be implemented by the processor 1601 in FIG. 16.

An embodiment of this application further provides a communication system. The communication system includes the foregoing communication apparatus configured to perform the first node side solution and the foregoing communication apparatus configured to perform the second node side solution; or may further include a communication apparatus of another node side solution, for example, may further include a communication apparatus of a third node side solution.

This application further provides a computer program product. The computer program product includes computer program code. When the computer program code is run on a computer, the computer is enabled to perform the method in any one of embodiments shown in FIG. 10, FIG. 13, or FIG. 14.

According to the method provided in embodiments of this application, this application further provides a computer-readable storage medium. The computer-readable medium stores program code. When the program code is run on a computer, the computer is enabled to perform the method in any one of embodiments shown in FIG. 10, FIG. 13, or FIG. 14.

All or some of embodiments may be implemented by using software, hardware, firmware, or any combination thereof. When software is used to implement embodiments, all or a part of embodiments may be implemented in a form of a computer program product. The computer program product includes one or more computer instructions. When the computer instructions are loaded and executed on the computer, the procedure or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, for example, a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (solid state disc, SSD)), or the like.

The network node in the foregoing apparatus embodiments corresponds to the first node and the second node in the method embodiments. A corresponding module or unit performs a corresponding step. For example, a communication unit (a transceiver) performs a receiving step or a sending step in the method embodiments, and a step other than the sending step and the receiving step may be performed by a processing unit (a processor). For a function of a specific unit, refer to a corresponding method embodiment. There may be one or more processors.

Terminologies such as "component", "module", and "system" used in embodiments of this application indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

It should be understood that the terms "system" and "network" may be used interchangeably in embodiments of this application. "At least one" means one or more, and "a plurality of" means two or more. The term "and/or" describes an association relationship between associated objects and indicates that three relationships may exist. For example, A and/or B may indicate the following cases: Only A exists, both A and B exist, and only B exists, where A and B may be singular or plural. The character "/" generally indicates an "or" relationship between the associated objects. At least one of the following items (pieces) or a similar expression thereof refers to any combination of these items, including any combination of singular items (pieces) or plural items (pieces). For example, at least one of a, b, or c may represent: a, b, c, a and b, a and c, b and c, or a, b, and c, where a, b, and c may be singular or plural.

In addition, unless otherwise stated, ordinal numbers such as "first" and "second" in embodiments of this application are for distinguishing between a plurality of objects, but are not intended to limit an order, a time sequence, priorities, or importance of the plurality of objects. For example, a first message and a second message are merely intended to distinguish between different messages, but do not indicate that the two messages are different in a priority, a sending sequence, or importance.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with illustrative logical blocks described in embodiments disclosed in this specification and steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed systems, apparatuses, and methods may be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A service flow adjustment method comprising:
receiving, by a first node, a first client signal flow from a second node by using N slots of a first bundling group, wherein the first client signal flow comprises slot adjustment information, the first bundling group comprises P physical layer (PHY) links, a bandwidth resource of each PHY link is divided into Q slots, bandwidth resources of the first bundling group are divided into P×Q slots, and N, P, and Q are all integers greater than or equal to 1; and
after first duration starting from a time at which the first node detects the slot adjustment information, receiving, by the first node, the first client signal flow from the second node by using M slots of the first bundling group, wherein M is an integer greater than or equal to 1.

2. The method according to claim 1, wherein the receiving, by the first node, the first client signal flow from the second node by using the N slots of the first bundling group comprises:
receiving, by the first node, a plurality of code blocks by using the N slots of the first bundling group, wherein the slot adjustment information is carried on at least one of the plurality of code blocks.

3. The method according to claim 1, further comprising:
before the first duration, sending, by the first node, the first client signal flow to a third node by using N slots of a second bundling group, wherein the first client signal flow comprises the slot adjustment information; and
after second duration starting from a time at which the first node detects the slot adjustment information, sending, by the first node, the first client signal flow to the third node by using M slots of the second bundling group.

4. The method according to claim 1, further comprising:
before the first duration, sending, by the first node to a third node by using N slots of a second bundling group, the first client signal flow obtained after the slot adjustment information is deleted from the first client signal flow; and
after the first duration, sending, by the first node, the first client signal flow to the third node by using M slots of the second bundling group, wherein the first client signal flow comprises the slot adjustment information which is added back to the first client signal flow.

5. The method according to claim 4, wherein M is greater than N, and in a process in which the first node sends the first client signal flow to the third node by using the N slots of the second bundling group, the first node fills, with an idle code block, a slot not carrying the first client signal flow in the M slots.

6. The method according to claim 4, wherein M is less than N, and at least one of the N slots received by the first node is filled with an idle code block.

7. The method according to claim 1, wherein the slot adjustment information carries the first duration.

8. The method according to claim 7, wherein that the slot adjustment information carries the first duration comprises:
the slot adjustment information is carried in a type field of a first code block in the first client signal flow, the type field indicates a type of the first code block and the first duration, and different values of the type field correspond to different first duration; or
the slot adjustment information is carried in a type field and a value field of the first code block in the first client signal flow, the type field indicates a type of the first code block, and the value field indicates the first duration.

9. The method according to claim 7, wherein
the slot adjustment information comprises a first coefficient indicating a quantity of unit duration which is duration for transmitting a plurality of code blocks, and the first duration is unit duration associated with the first coefficient.

10. The method according to claim 3, wherein before receiving, by the first node, the first client signal flow from the second node by using the N slots of the first bundling group, the method further comprises:

receiving, by the first node, a second client signal flow from the second node, wherein the second client signal flow carries third duration, and the third duration is used to query shortest duration required by the first node to switch from receiving the first client signal flow by using the N slots to receiving the first client signal flow by using the M slots, and/or shortest duration required by the first node to switch from sending the first client signal flow by using the N slots to sending the first client signal flow by using the M slots; and sending, by the first node, the second client signal flow to the third node, wherein the second client signal flow carries fourth duration, wherein based on the shortest duration being less than or equal to the third duration, the fourth duration is equal to the third duration, and wherein based on the shortest duration being greater than the third duration, the fourth duration is the shortest duration.

11. The method according to claim 10, further comprising:

receiving, by the first node, a third client signal flow from the third node, wherein the third client signal flow carries the first duration; and sending, by the first node, the third client signal flow to the second node.

12. The method according to claim 3, wherein before receiving, by the first node, the first client signal flow from the second node by using the N slots of the first bundling group, the method further comprises:

receiving, by the first node, a fourth client signal flow from the second node, wherein the fourth client signal flow comprises an identifier parameter, and the identifier parameter is used to query whether the first node has updated configuration information about receiving the first client signal flow by using the M slots, wherein based on a value of the identifier parameter being a first value, it is indicated that the configuration information has been updated, and wherein based on a value of the identifier parameter being a second value, it is indicated that the configuration information has not been updated; and sending, by the first node, the fourth client signal flow to the third node, wherein when the first node has not updated the configuration information, the value of the identifier parameter is the second value.

13. The method according to claim 12, further comprising:

receiving, by the first node, a fifth client signal flow from the third node, wherein a value of an identifier parameter comprised in the fifth client signal flow is the first value or the second value; and sending, by the first node, the fifth client signal flow to the second node.

14. A communication apparatus, comprising a processor and a transceiver, wherein the transceiver is configured to cooperate with the processor to receive a first client signal flow from a second node by using N slots of a first bundling group, wherein the first client signal flow comprises slot adjustment information, the first bundling group comprises P physical layer (PHY) links, a bandwidth resource of each PHY link is divided into Q slots, bandwidth resources of the first bundling group are divided into P×Q slots, and N, P, and Q are all integers greater than or equal to 1; and the processor is configured to: after first duration starting from a time at which the processor detects the slot adjustment information, control the transceiver to receive the first client signal flow from the second node by using M slots of the first bundling group, wherein M is an integer greater than or equal to 1.

15. The communication apparatus according to claim 14, wherein the transceiver is further configured to cooperate with the processor to:

receive a plurality of code blocks by using the N slots of the first bundling group, wherein the slot adjustment information is carried on at least one of the plurality of code blocks.

16. The communication apparatus according to claim 14, wherein the transceiver is further configured to cooperate with the processor to: before the first duration, send the first client signal flow to a third node by using N slots of a second bundling group; and the processor is further configured to: after second duration starting from a time at which the processor detects the slot adjustment information, control the transceiver to send the first client signal flow to the third node by using M slots of the second bundling group.

17. The communication apparatus according to claim 14, wherein the transceiver is further configured to cooperate with the processor to:

before the first duration, send, to a third node by using N slots of a second bundling group, the first client signal flow obtained after the slot adjustment information is deleted from the first client signal flow; and after the first duration, send the first client signal flow to the third node by using M slots of the second bundling group, wherein the first client signal flow comprises slot adjustment information which is added back to the first client signal flow.

18. The communication apparatus according to claim 17, wherein M is greater than N, and in a process in which the transceiver sends the first client signal flow to the third node by using the N slots of the second bundling group, the processor fills, with an idle code block, a slot not carrying the first client signal flow in the M slots.

19. The communication apparatus according to claim 17, wherein M is less than N, and at least one of the N slots received by the transceiver is filled with an idle code block.

20. The communication apparatus according to claim 14, wherein the slot adjustment information carries the first duration.

* * * * *